(12) United States Patent
Kadota et al.

(10) Patent No.: US 6,652,385 B2
(45) Date of Patent: Nov. 25, 2003

(54) CONSTANT VELOCITY UNIVERSAL JOINT

(75) Inventors: Tetsuro Kadota, Iwata (JP); Kennta Yamazaki, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/267,839

(22) Filed: Oct. 10, 2002

(65) Prior Publication Data

US 2003/0050125 A1 Mar. 13, 2003

Related U.S. Application Data

(62) Division of application No. 09/674,500, filed as application No. PCT/JP99/03371 on Jun. 24, 1999, now Pat. No. 6,488,588.

(30) Foreign Application Priority Data

Mar. 12, 1999 (JP) ............................................... 11-67032

(51) Int. Cl.[7] .................................................. F16D 3/224
(52) U.S. Cl. ...................................... 464/145; 464/906
(58) Field of Search ................................. 464/145, 146, 464/906; 384/526

(56) References Cited

U.S. PATENT DOCUMENTS

| | | | |
|---|---|---|---|
| 3,789,626 A | 2/1974 | Girguis | |
| 4,188,803 A * | 2/1980 | Otsuka et al. | 464/145 |
| 4,820,420 A | 4/1989 | Girguis | |
| 5,616,081 A | 4/1997 | Krude et al. | |
| 5,855,519 A | 1/1999 | Kadota | |
| 6,299,544 B1 | 10/2001 | Schwarzler et al. | |

FOREIGN PATENT DOCUMENTS

DE    196 53 573 A1    12/1996

* cited by examiner

*Primary Examiner*—Greg Binda
(74) *Attorney, Agent, or Firm*—Arent Fox Kintner Plotkin & Kahn, PLLC

(57) ABSTRACT

The constant velocity universal joint comprises an outer joint member 1 that has three curved guide grooves 1b formed in the axial direction on a spherical inner circumferential surface 1a thereof, an inner joint member 2 that has three curved guide grooves 2b formed in the axial direction on a spherical outer circumferential surface 2a thereof, three torque transmitting balls 3 disposed in ball tracks that are formed by the coordination of the guide grooves 1b of the outer joint member 1 and the guide grooves 2b of the inner joint member 2, a cage 4 that holds the balls 3, and elastic pressing means 5 interposed between the outer circumferential surface 2a of the inner joint member 2 and the inner circumferential surface 4a of the cage 4.

11 Claims, 22 Drawing Sheets

F I G. 4
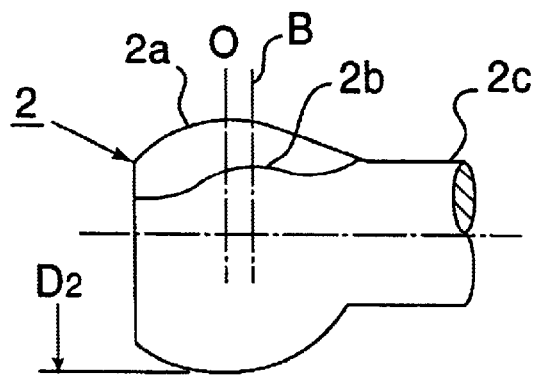
F I G. 5(a)
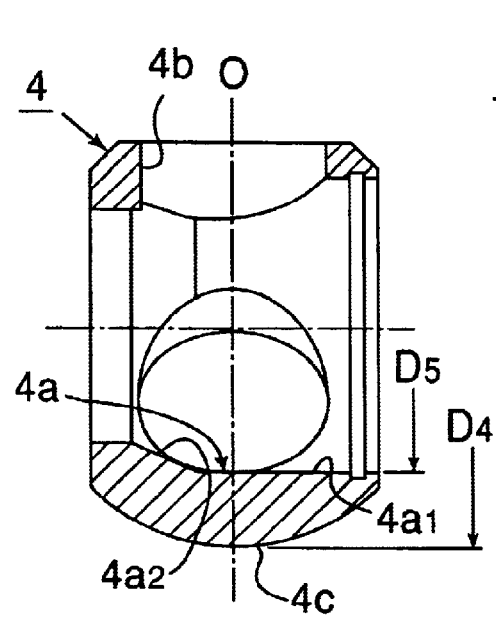
F I G. 5(b)
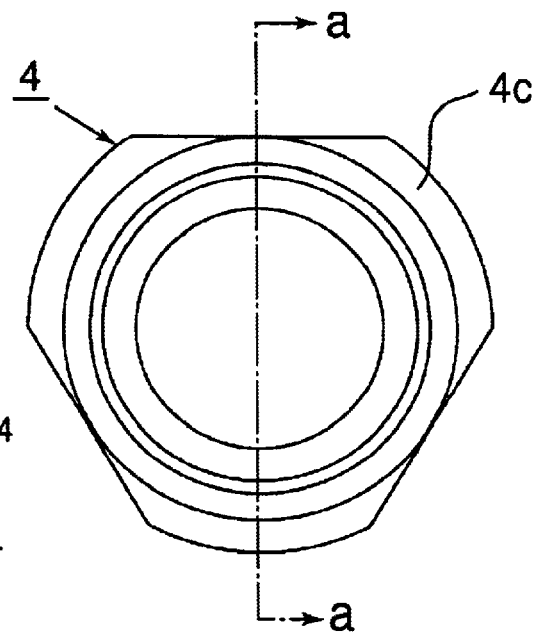

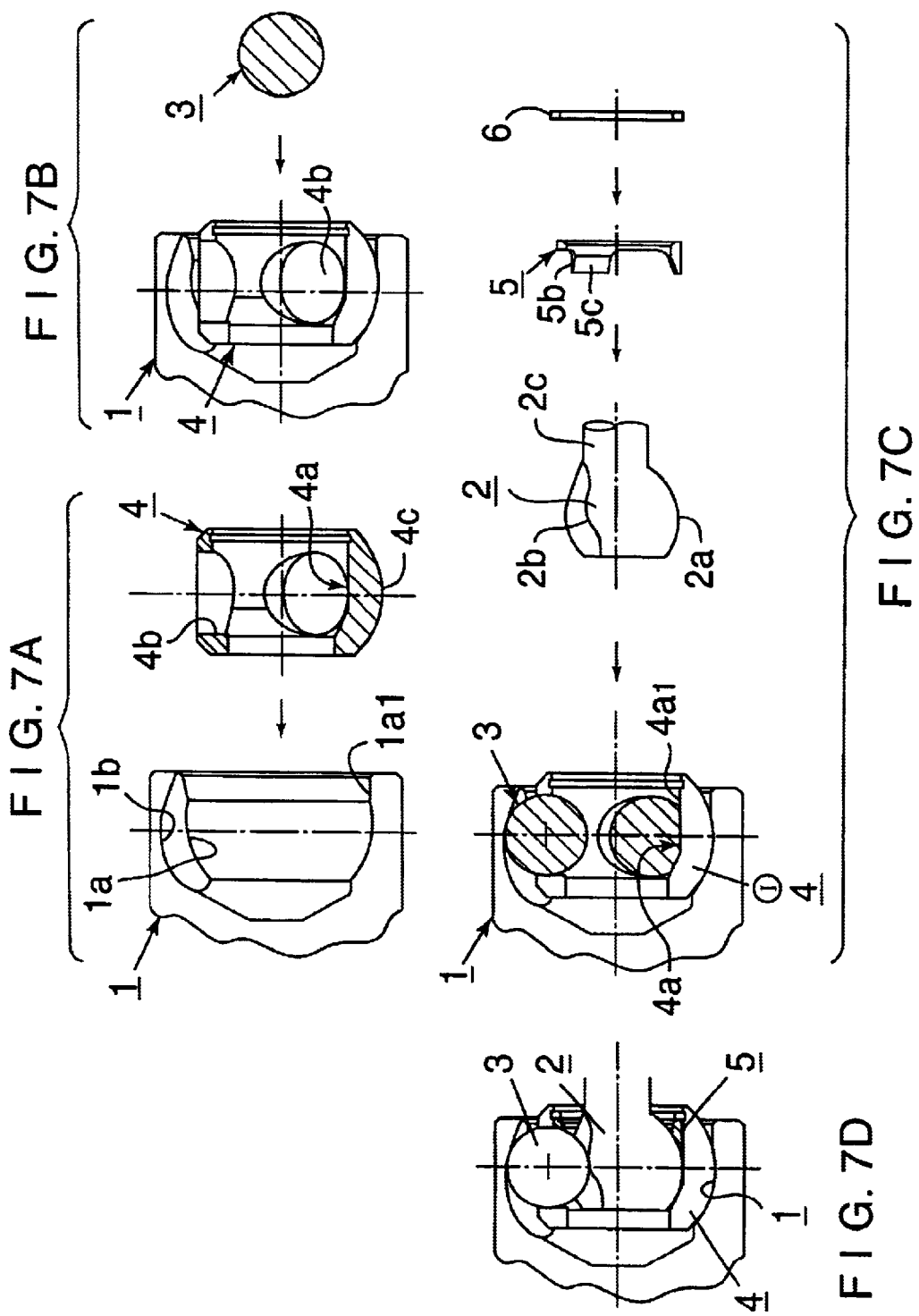

F I G. 9(a)
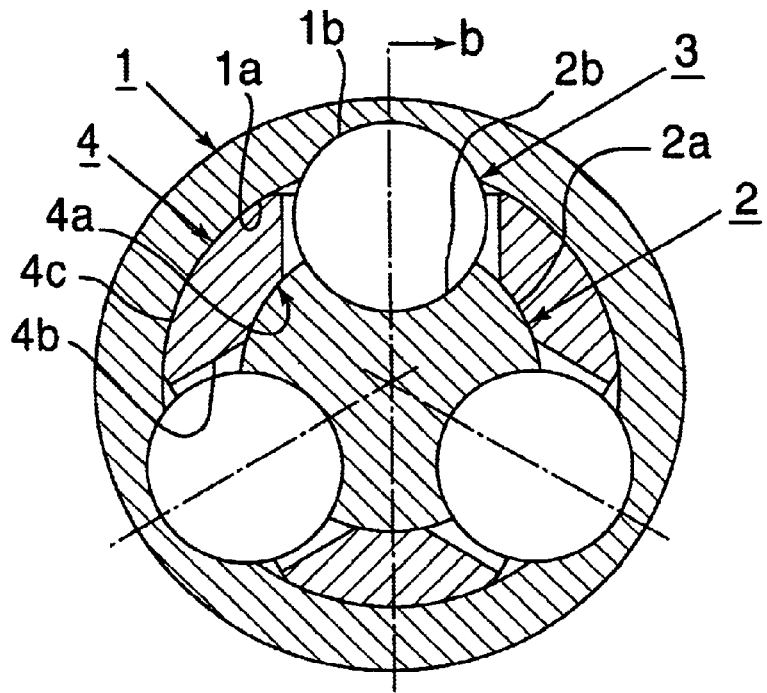
F I G. 9(b)
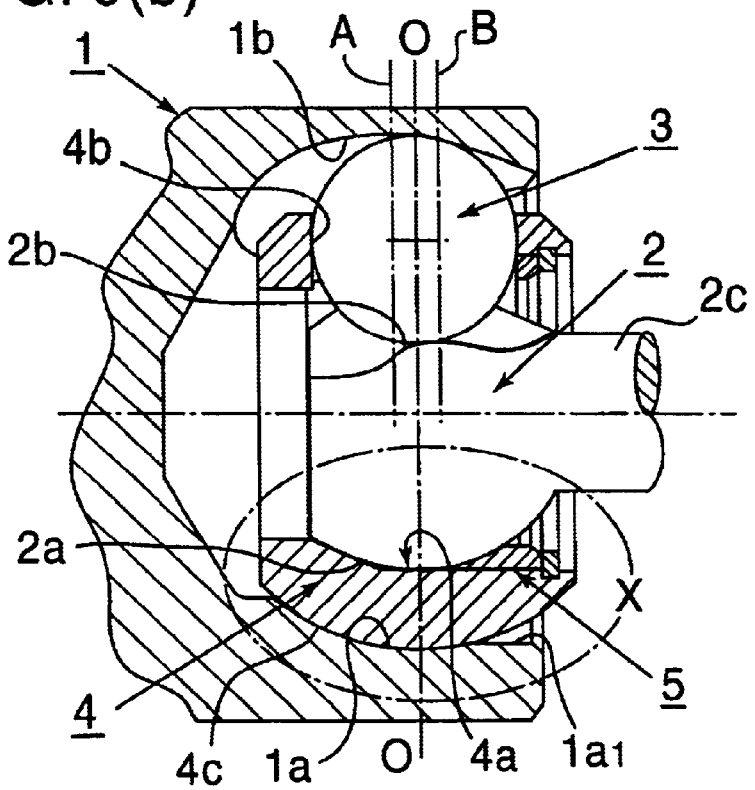

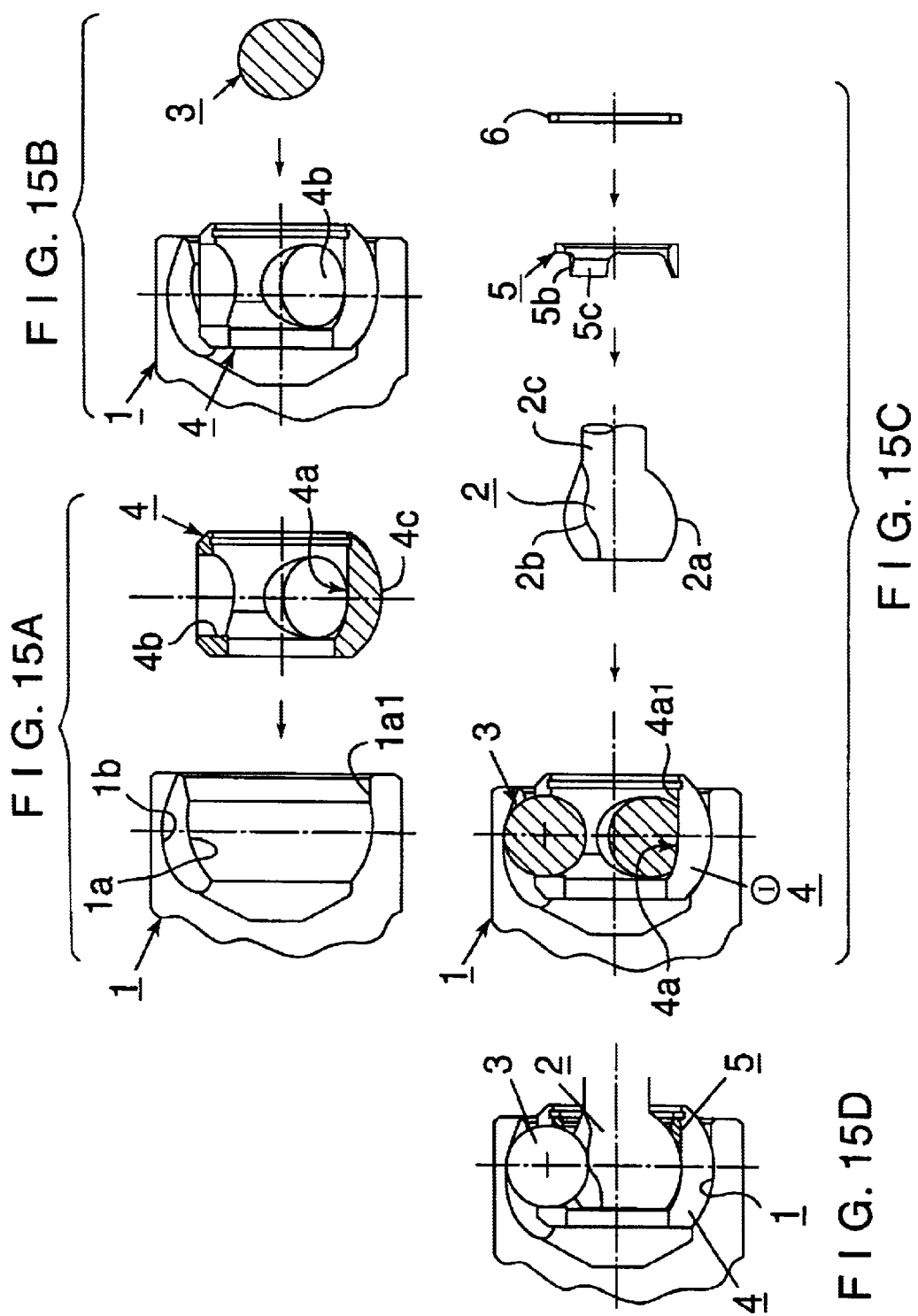

$\delta = L - D_{BALL}$

F I G. 31(a)
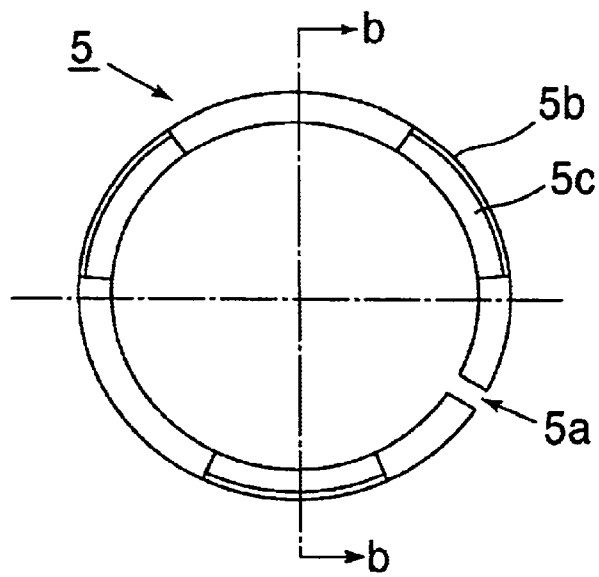
F I G. 31(b)
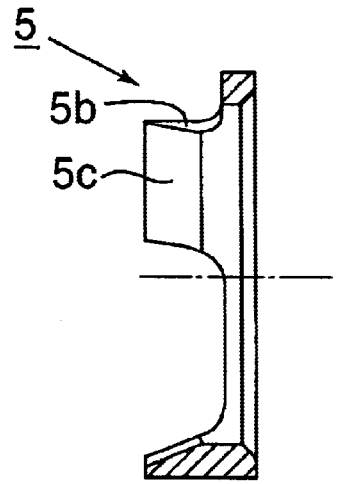
F I G. 32
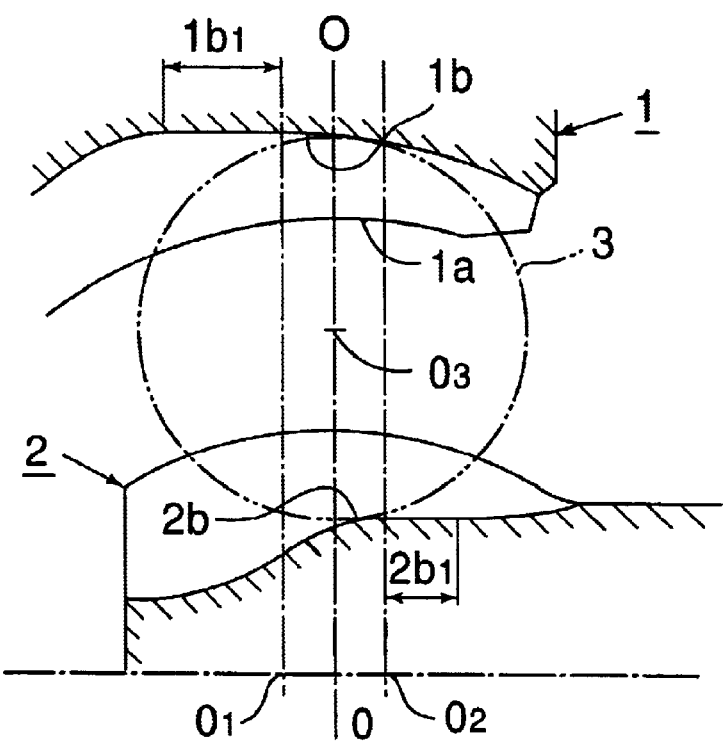

US 6,652,385 B2

CONSTANT VELOCITY UNIVERSAL JOINT

This application is a division of U.S. application Ser. No. 09/674,500, filed Dec. 22, 2000, now U.S. Pat. No. 6,488,588, which was the National Stage of International Application No. PCT/JP99/03371, filed Jun. 24, 1999, now abandoned, which claimed priority under 35 U.S.C. §365(b) from Japanese Patent Application Nos. 11-67032 and 11-67033, filed Mar. 12, 1999, in Japan.

BACKGROUND OF THE INVENTION

The present invention relates to a constant velocity universal joint that is suited to applications where rotation backlash is undesirable, and is particularly preferable for the steering apparatus of an automobile.

In the steering apparatus of an automobile, for example as shown schematically in FIG. 34, rotation torque imparted to a steering wheel 20 is transmitted via a main shaft 21 of a steering column and an intermediate shaft 22 to a gear shaft (pinion shaft or the like) 24 of a steering gear 23, while being converted to a linear motion by the mechanism of the steering gear 23 thereby to be transmitted via a link mechanism (knuckle or the like) 25 to wheels 26 as steering force. The steering gear 23 may be one of various types including rack and pinion type, ball screw type and worm roller type, while the rack and pinion type is predominantly used for the reason of high rigidity and light weight thereof. The intermediate shaft 22 is disposed at an angle to the main shaft 21 and the gear shaft 24, and is connected to the main shaft 21 and the gear shaft 24 via universal joints 27, 28, for the purpose of absorbing the impact energy in case of collision.

While the Cardan joint (universal joint employing cross yokes) has been predominantly used for the universal joints (27, 28) of the steering apparatus, constant velocity universal joints are being increasingly employed instead of the Cardan joint in order to allow a larger angle in the joint (in conjunction with the layout of vehicle components) and improve the movement of the joint (feel of the steering operation).

Meanwhile a constant velocity universal joint of ordinary constitution has a small clearance (inner gap) between torque transmitting ball and a ball track, which inevitably results in rotation backlash (play in the circumferential direction) taking place in the joint when the direction of rotation changes. Thus use of the constant velocity universal joint of the ordinary constitution in the steering apparatus leads to such problems as the loss of stability in steering, and loss of sharp or direct feel of steering.

In the field of automobile, constant velocity universal joints have many records of applications to the drive shaft, and the constant velocity universal joint of the ordinary constitution is normally designed to such specifications that satisfy the requirements of the drive shaft. In the case of the steering apparatus, however, since less load torque is applied to the joint and the joint rotates at lower speeds than the drive shaft, the constant velocity universal joint of the ordinary constitution has rather excessively higher specifications compared to the required characteristics, and therefore improvements are required for the reduction of joint weight and manufacturing cost.

The ball fixed type constant velocity universal joint of this type also requires the complicated assembly process as described above, and therefore has such disadvantages as follows.

(1) The assembly work requires skilled technique and is difficult to mechanize (automate).
(2) It is necessary to make the guide grooves of the inner and outer joint members longer (in the axial direction) than the length required for the function, in order to facilitate the assembly of the balls, thus resulting in larger joint dimension.
(3) It is necessary to make the size of the pocket of the cage in the circumferential direction larger, in order to facilitate the assembly of the balls (because the balls move in the circumferential direction in the pocket of the cage when the inner and outer joint members are caused to make angular displacement). This makes a disadvantage in the design of the cage in terms of strength.
(4) It is necessary to prepare the inner joint member and the shaft separately (in case the inner joint member and the shaft are prepared as an integral part, the shaft interferes with the outer joint member when assembling the balls, thus making it impossible to secure the amount of angular displacement required for the assembly). This leads to increases in the number of parts and in the number of assembly steps.

SUMMARY OF THE INVENTION

An object of the present invention is to solve the problem of rotation backlash in the ball fixed type constant velocity universal joint, and provide a simpler, light weight, compact and low-cost ball fixed type constant velocity universal joint that can be assembled in an improved process.

Another object of the present invention is to ensure good feel of rotation (smoothness of rotation) and, when applied to the steering apparatus in particular, improve the performance such as the feel of steering, while maintaining the constant velocity characteristics of this type of constant velocity universal joint.

Yet another object of the present invention is to reduce the resistance to the rotation in the constant velocity universal joint of this type and ensure good feel of rotation (smoothness of rotation) and, when used in a steering apparatus in particular, improve the performance such as the steering force, auto-centering of the steering wheel and the feel of steering.

In order to achieve the objects described above, the present invention provides a ball fixed type constant velocity universal joint comprising an outer joint member having a curved guide groove formed in the axial direction on a spherical inner circumferential surface thereof, an inner joint member having a curved guide groove formed in the axial direction on a spherical outer circumferential surface thereof, ball disposed in a ball track formed by the coordination of the guide groove of the outer joint member and the guide groove of the inner joint member, and a cage that holds the ball, with the center of the guide groove of the outer joint member and the center of the guide groove of the inner joint member being offset to the opposite sides to each other by equal distances in the axial direction with respect to the center plane of the joint that include the centers of the ball, the ball track being gradually reduced toward the opening or the innermost side of the joint, wherein the inner joint member is allowed to make relative displacement in the axial direction with respect to the cage, and elastic pressing means having a spherical surface that makes fitting contact with the outer circumferential surface of the inner joint member is interposed between the outer circumferential surface of the inner joint member and the inner circumferential surface of the cage, so that the elastic force of the elastic pressing means presses the outer circumferential surface of the inner joint member toward the side opposite to the offset direction of center of the guide groove thereof.

The inner joint member makes a relative displacement in the axial direction opposite to the offset direction under the urging pressure of the elastic pressing means, thereby to press the ball, and stops at a position where the inner gap between the balls and the guide grooves of the inner and outer joint members disappears. As a result, a certain amount of preload is applied in the axial direction to the ball, thus eliminating the rotation backlash (play in the circumferential direction). Also because the spherical surface of the elastic pressing means presses the outer circumferential surface of the inner joint member, the surface pressure in the portion of contact between both members is reduced and the outer circumferential surface of the inner joint member can be guided by the spherical surface.

In the constitution described above, the ball track may have such a configuration that is gradually reduced toward the opening side of the joint, at least the region on the opening side of the inner circumferential surface of the cage is a cylindrical surface that fits with the outer circumferential surface of the inner joint member, and the elastic pressing means is disposed on the cylindrical surface. This configuration makes it possible to assemble the inner joint member into the inner circumferential surface of the cage after assembling the cage and the ball into the outer joint member.

In addition to the constitution described above, the region on the opening side of the inner circumferential surface of the outer joint member may have a cylindrical surface that fits with the outer circumferential surface of the cage. This configuration makes it easier to assemble the cage into the outer joint member.

Since the inner joint member can be assembled after assembling the cage and the balls in the outer joint member, it is made possible to integrate the inner joint member and the shaft (to form in an integral part, or bond together) thereby decreasing the number of parts and the number of assembly steps, without causing any trouble in the assembly operation.

Further, in order to achieve the objects described above, the present invention provides a ball fixed type constant velocity universal joint comprising an outer joint member having a curved guide groove formed in the axial direction on a spherical inner circumferential surface thereof, an inner joint member having a curved guide groove formed in the axial direction on a spherical outer circumferential surface thereof, ball disposed in ball track formed by the coordination of the guide groove of the outer joint member and the guide groove of the inner joint member, and a cage that holds the ball, with the center of the guide groove of the outer joint member and the center of the guide groove of the inner joint member being offset to the opposite sides to each other by equal distances in the axial direction with respect to the center plane of the joint that includes the center of the ball, the ball track being gradually reduced toward the opening or the innermost side of the joint, wherein at least the region on the opening side of the inner circumferential surface of the cage is formed in a cylindrical surface that fits the outer circumferential surface of the inner joint member, and a retaining member having a spherical portion that makes fitting contact with the outer circumferential surface of the inner joint member is disposed on the cylindrical surface. This type constant velocity universal joint can be used for a connection joint for drive shafts, propeller shafts or the like of automobile, in addition to steering apparatus.

This configuration makes it possible to assemble the inner joint member into the inner circumferential surface of the cage after assembling the cage and the ball into the outer joint member, by forming at least the region on the opening side of the inner circumferential surface of the cage in a cylindrical surface that fits the outer circumferential surface of the inner joint member. After being assembled in the inner circumferential surface of the cage, the inner joint member is retained in place by the retaining member that is disposed on the cylindrical surface of the cage. The outer circumferential surface of the inner joint member is guided by the spherical portion of the retaining member.

In addition to the constitution described above, the region on the opening side of the inner circumferential surface of the outer joint member may also be formed in a cylindrical surface that fits the outer circumferential surface of the cage. This configuration makes it easier to assemble the cage into the outer joint member.

Since the inner joint member can be assembled after assembling the cage and the ball in the outer joint member, it is made possible to integrate the inner joint member and the shaft (to form in an integral part, or bond together) thereby decreasing the number of parts and the number of assembly steps, without causing any trouble in the assembling operation.

Also, in order to achieve the objects described above, the present invention provides a constant velocity universal joint comprising an outer joint member having a curved guide groove formed in the axial direction on a spherical inner circumferential surface thereof, the guide groove having center of curvature at a point (O1) that is offset by a predetermined distance (f1) from the center of curvature of the spherical inner circumferential surface to one side in the axial direction, an inner joint member having a curved guide groove formed in the axial direction on a spherical outer circumferential surface thereof, the guide groove having center of curvature at a point (O2) that is offset by a predetermined distance (f2) from the center of curvature of the spherical outer circumferential surface to the other side in the axial direction, a ball track formed by the coordination of the guide groove of the outer joint member and the guide groove of the inner joint member that opposes the former, the ball track having wedge-like shape that reduces toward the other side in the axial direction, torque transmitting ball disposed in the ball track, a cage that holds the torque transmitting ball, and preloading means that reduces a clearance between the torque transmitting balls and the ball track by causing an elastic relative displacement to take place in the axial direction between at least one of the outer joint member and the inner joint member and the torque transmitting ball, wherein the offset distance (f1) of the center of curvature (O1) of the guide groove of the outer joint member and the offset distance (f2) of the center of curvature (O2) of the guide groove of the inner joint member are set to have different values, and such a configuration is employed as the center of curvature (O1) and the center of curvature (O2) are offset to the opposite sides by the same distances (f) in the axial direction with respect to the center plane of the joint that includes the center of the torque transmitting ball, when the clearance is reduced by the preloading means.

Specific embodiments of the preloading means may be, for example, (1) to have the torque transmitting ball undergo a displacement in the axial direction toward the reduced side of the ball track, (2) to have the inner joint member undergo a displacement in the axial direction opposite to the offset direction of the center of curvature of the guide groove thereof, (3) to have the outer joint member undergo a displacement in the axial direction to the offset direction of the center of curvature of the guide groove thereof, or (4) to have the inner joint member undergo a displacement in the axial direction opposite to the offset direction of the center of curvature of the guide groove thereof and to have the outer joint member undergo a displacement in the axial direction to the offset direction of the center of curvature of the guide groove thereof.

Relation of inequality and difference between the offset distance (f1) of the center of curvature (O1) of the guide groove of the outer joint member and the offset distance (f2) of the center of curvature (O2) of the guide groove of the inner joint member are set by taking into consideration the mode of preloading, the amount of inner gap (the amount of rotation backlash: play in the circumferential direction), presence and size of clearance between the torque transmitting ball and the cage and other factors, so that the center of curvature (O1) and the center of curvature (O2) are offset to the opposite sides by the same distances (f) in the axial direction with respect to the center plane of the joint that includes the center of the torque transmitting ball when the clearance is reduced by the preloading means. This makes it possible to achieve good feel of rotation (smoothness of rotation) while maintaining the constant velocity characteristics of the joint. Relation between the offset distance (f1) and the offset distance (f2) may be set to satisfy f1>f2, or to satisfy f1<f2.

The preloading means may be constituted from, for example, a clearance provided in the axial direction between the inner joint member and the cage, and an elastic member that is interposed between the inner joint member and the cage and presses the inner joint member in a direction opposite to the offset direction of the center of the guide groove of the inner joint member. In this case, under the pressing force of the elastic member applied thereto, the inner joint member makes a relative displacement in the axial direction opposite to the offset direction of the center of curvature of the guide groove thereby to press the torque transmitting ball, and stops at a position where the inner gap between the torque transmitting balls and the guide groove (ball track) of the inner and outer joint members disappears. As a result, a certain amount of preload is applied in the axial direction to the torque transmitting ball, thus eliminating the rotation backlash (play in the circumferential direction).

Regions that are free of undercut may be provided in the guide grooves of the outer joint member and the inner joint member. This makes it possible to increase the operating angle of the joint.

The region on the opening side of the inner circumferential surface of the outer joint member may be formed in a cylindrical surface that fits with the outer circumferential surface of the cage. This makes it easier to assemble the cage into the outer joint member.

The constant velocity universal joint of the present invention is light in weight, small in size and low cost, and rotates smoothly without backlash while being capable of taking a large operating angle, and is therefore particularly preferable for the steering apparatus of an automobile.

Also, in order to solve the problems described above, the present invention provides a constant velocity universal joint comprising an outer joint member having a curved guide groove formed in the axial direction on a spherical inner circumferential surface thereof, an inner joint member having a curved guide groove formed in the axial direction on a spherical outer circumferential surface thereof, a ball track formed by the coordination of the guide groove of the outer joint member and the guide groove of the inner joint member that opposes the former, the ball track having wedge-like shape that reduces toward one side in the axial direction, torque transmitting ball disposed in the ball track, a cage having a pocket that holds the torque transmitting ball, and preloading means that reduces the clearance between the torque transmitting balls and the ball track, wherein the clearance δ of the pocket in the axial direction between the pocket of the cage and the torque transmitting ball is set in a range of $0 \leq \delta \leq 55$ μm.

The reason for setting the clearance δ of the pocket in the axial direction in the range of $0 \leq \delta \leq 55$ μm is as follows. In the constant velocity universal joint of this type (ball fixed type constant velocity universal joint), the clearance δ of the pocket in the axial direction is normally set to be $\delta < 0$ (negative clearance) thereby allowing a slight tightening allowance between the pocket of the cage and the torque transmitting ball, in view of the importance placed on the function of the cage to guide the torque transmitting ball (function to keep the torque transmitting ball in the bisecting plane (θ/2) of the operating angle θ, thereby to ensure constant velocity characteristic of the joint). However, since setting the clearance δ of the pocket in the axial direction to a negative value makes it difficult for the torque transmitting ball to roll over the ball track, this setting has a disadvantage in terms of the resistance to rotation (torque) when the joint of this type transmits rotation torque while taking an operation angle. Resistance of the joint to rotation affects the performance such as the steering force and auto-centering capability in a steering apparatus, and is preferably as small as possible. Although rolling performance of the torque transmitting balls can be improved thereby decreasing the resistance of the joint to rotation by setting the clearance δ of the pocket in the axial direction to be $\delta \geq 0$ (positive clearance), making the clearance δ of the pocket in the axial direction too large leads to a decrease in the capability of the cage to guide the torque transmitting ball, resulting in the loss of the constant velocity characteristic of the joint. In the steering apparatus, loss of the constant velocity characteristic of the joint leads to the generation of unusual sound and deterioration in the feel of steering such as hitch. Therefore, it is necessary to set the clearance δ of the pocket in the axial direction in an optimum range in order to reduce the resistance of the joint to rotation and achieve good feel of steering (smoothness of rotation).

Accordingly, a test was conducted to determine the optimum range of the clearance δ of the pocket in the axial direction. The results are shown in Table 1. The test was conducted on the constant velocity universal joint of this embodiment shown in FIG. 1 and FIG. 2. Sample joints having different sizes of clearance δ of the pocket (δ=L−$D_{BALL}$: refer to FIG. 6) in the axial direction were fabricated and tested to evaluate the resistance to rotation and the feel of steering (smoothness of rotation) under a predetermined operating angle θ and a predetermined magnitude of rotation torque applied thereto. The resistance to rotation was evaluated by whether it was greater or smaller than a criterion. The feel of steering was rated as ○ when a criterion was exceeded, Δ when the criterion was missed with a little margin and ▲ when the criterion could not be reached with a large margin. Comprehensive evaluation which combined the resistance to rotation and the feel of steering was rated as ○ when the total criterion was reached or Δ when not.

TABLE 1

| Clearance δ of the pocket in the axial direction (μm) | -20 | 0 | +20 | +55 | +80 |
|---|---|---|---|---|---|
| Resistance to rotation | Greater | Smaller | Smaller | Smaller | Smaller |
| Feel of steering | △ | ○ | ○ | ○ | ▲ |
| Comprehensive evaluation | △ | ○ | ○ | ○ | △ |

As will be apparent from the test results, satisfactory performance was achieved in both the resistance to rotation and the feel of steering when the clearance δ of the pocket in the axial direction was set in a range of $0 \leq \delta \leq 55$ μm. When δ<0, resistance of the joint to rotation increases because it becomes difficult for the torque transmitting balls to roll. When δ>55 μm, on the other hand, the joint cannot operate with satisfactory constant velocity characteristic, thus resulting in poorer feel of steering with such impression as hitch. In view of reducing the resistance of the joint to rotation and achieving good feel of steering (smoothness of rotation) while maintaining the constant velocity characteristic, the optimum range for the clearance δ of the pocket in the axial direction is $0 \leq \delta \leq 55$ μm.

The preloading means reduces the inner clearance provided between the torque transmitting ball and the ball track by causing a relative displacement between any two components among the outer joint member, the inner joint member, the cage and the torque transmitting ball. The preloading means may be constituted from, for example, a clearance provided in the axial direction between the inner joint member and the cage, and an elastic member that is interposed between the inner joint member and the cage and presses the inner joint member in a direction opposite to the offset direction of the center of the guide groove of the inner joint member. In this case, under the pressing force of the elastic member applied thereto, the inner joint member makes a relative displacement in the axial direction opposite to the offset direction of the guide groove thereby to press the torque transmitting ball, and stops at a position where the inner clearance between the torque transmitting ball and the guide grooves (ball track) of the inner and outer joint members disappears. As a result, a certain amount of preload is applied in the axial direction to the torque transmitting balls, thus eliminating the rotation backlash (play in the circumferential direction).

Regions that are free of undercut may be provided in the guide grooves of the outer joint member and the inner joint member. This makes it possible to increase the operating angle of the joint.

The region on the opening side of the inner circumferential surface of the outer joint member may be formed in a cylindrical surface that fits with the outer circumferential surface of the cage. This makes it easier to assemble the cage into the outer joint member.

The constant velocity universal joint of the present invention is light in weight, small in size and low cost, and rotates smoothly without backlash with less resistance to rotation, while being capable of taking a large operating angle, and is therefore particularly preferable for the steering apparatus of an automobile.

BRIEF DESCRIPTION OF THE DRAWINGS

FIG. 1 shows a cross sectional view (FIG. 1a) illustrating first embodiment of the present invention and a longitudinal sectional view (FIG. 1b) taken along line b—b in FIG. 1a.

FIG. 4 is a longitudinal sectional view showing an inner joint member.

FIG. 5 shows a longitudinal sectional view (FIG. 5a) of a cage and a rightward view (FIG. 5b) of FIG. 5a.

FIG. 6 shows a front view (FIG. 6a) of elastic pressing means and a sectional view (FIG. 6b) taken along line b—b in FIG. 6a.

FIG. 7A illustrates a step of assembling a cage into the inner circumferential surface of the outer joint member in a process of assembling the constant velocity universal joint according to a preferred embodiment;

FIG. 7B illustrates a step of assembling the ball into the pocket of the cage in the process of assembling the constant velocity universal joint;

FIG. 7C illustrates a step of assembling the inner joint member into the inner circumferential surface of the cage, assembling the elastic pressing device into the inner circumferential surface of the cage, and securing the elastic pressure device with a retainer ring in the process of assembling the constant velocity universal joint; and FIG. 7D illustrates the fully assembled joint.

FIG. 9 shows a cross sectional view (FIG. 9a) illustrating second embodiment of the present invention and a longitudinal sectional view (FIG. 9b) taken along line b—b in FIG. 9a.

FIG. 13 shows a longitudinal sectional view (FIG. 12a) of a cage and a rightward view (FIG. 13b) of FIG. 13a.

FIG. 14 shows a front view (FIG. 14a) of a retaining member and a sectional view (FIG. 14b) taken along line b—b in FIG. 14a.

FIG. 15A illustrates a step of assembling a cage into the inner circumferential surface of the outer joint member in a process of assembling the constant velocity universal joint according to a second embodiment;

FIG. 15B illustrates a step of assembling the ball into the pocket of the cage in the process of assembling the constant velocity universal joint;

FIG. 15C illustrates a step of assembling the inner joint member into the inner circumferential surface of the cage, assembling the elastic pressing device into the inner circumferential surface of the cage, and securing the elastic pressure device with a retainer ring in the process of assembling the constant velocity universal joint; and FIG. 15D illustrates the fully assembled joint.

FIG. 21 shows a longitudinal sectional view (FIG. 21a) of the cage and a rightward view (FIG. 21b) of FIG. 21a.

FIG. 22 shows a front view (FIG. 22a) of the elastic member and a sectional view (FIG. 22b) taken along line b—b in FIG. 22a.

FIG. 30 shows a longitudinal sectional view (FIG. 30a) of the cage and a rightward view (FIG. 30b) of FIG. 30a.

FIG. 31 shows a front view (FIG. 31a) of the elastic member and a sectional view (FIG. 31b) taken along line b—b in FIG. 31a.

FIG. 32 is an enlarged sectional view of a key portion of the constant velocity universal joint according to modification of the forth embodiment.

DESCRIPTION OF THE PREFERRED EMBODIMENTS

Now preferred embodiments of the present invention will be described below with reference to the accompanying drawings.

Figure 1A:
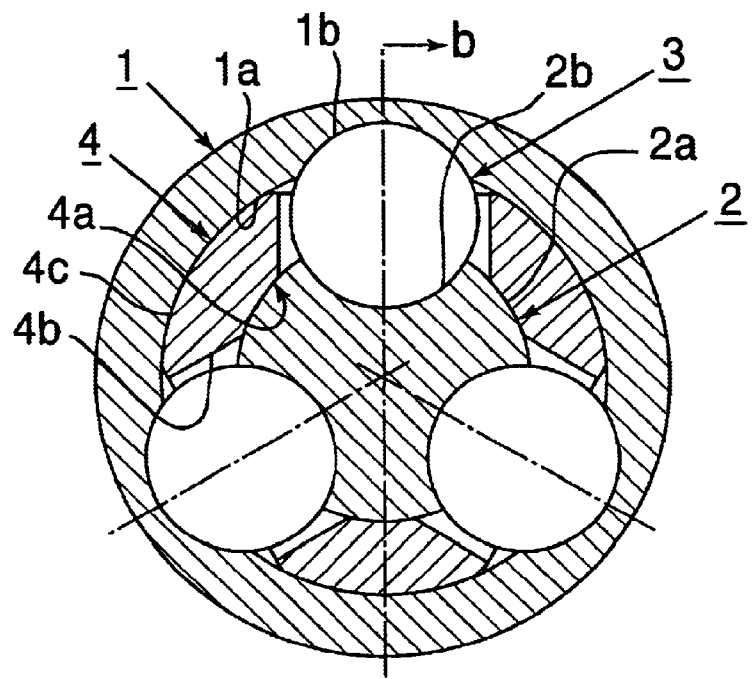
Figure 1B:
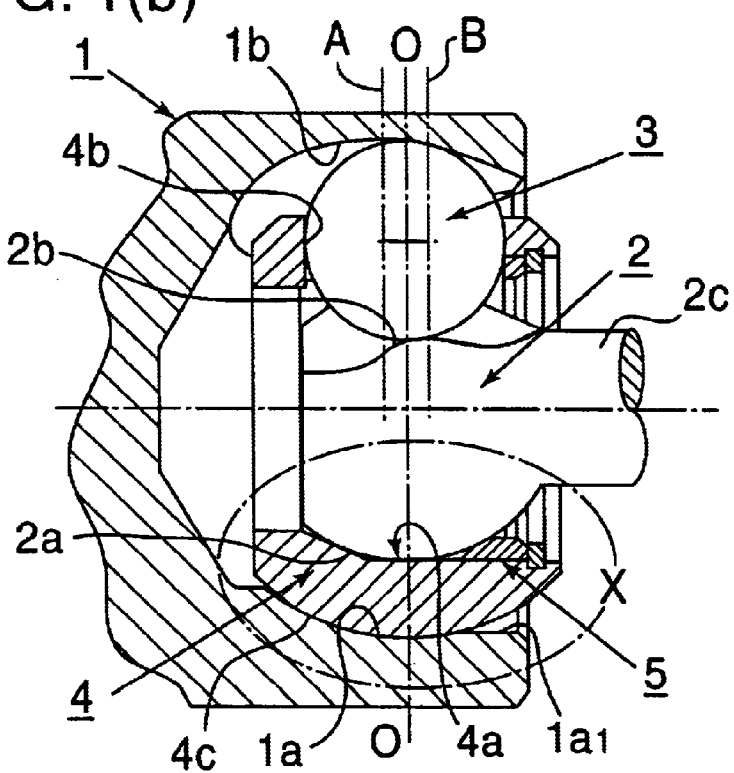

As shown in FIG. 1, the constant velocity universal joint of this embodiment comprises an outer joint member 1 that has, for example, three curved guide grooves 1b formed in the axial direction on a spherical inner circumferential surface 1a thereof, an inner joint member 2 that has, for example, three curved guide grooves 2b formed in the axial direction on a spherical outer circumferential surface 2a thereof, for example, three balls 3 disposed in ball tracks that are formed by the coordination of the guide grooves 1b of the outer joint member 1 and the guide grooves 2b of the inner joint member 2, a cage 4 that holds the balls 3, and elastic pressing means 5 interposed between the outer circumferential surface 2a of the inner joint member 2 and the inner circumferential surface 4a of the cage 4.

Figure 3:
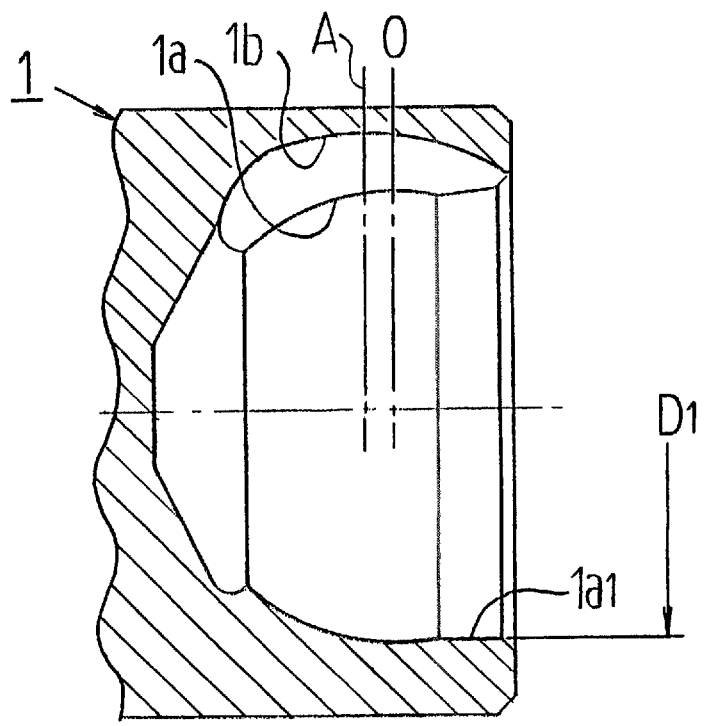
FIG. 3 is a longitudinal sectional view showing an outer joint member.

As shown in FIG. 3, the outer joint member 1 has a cup shape that opens at one end thereof and is provided with either a shaft formed integrally therewith at the other end not shown or a separate shaft being bonded by proper means. Center A of the guide groove 1b is offset by a predetermined distance in the axial direction (toward the innermost side of the joint in this embodiment) with respect to the center of curvature O of the inner circumferential surface 1a. A region on the opening side of the inner circumferential surface 1a is formed in a cylindrical surface 1a1. Inner radius D1 of the cylindrical surface 1a1 is made equal to or larger than the radius D4 (refer to FIG. 5) of the outer circumferential surface 4c of the cage 4 (D1≧D4).

In this embodiment, as shown in FIG. 4, the inner joint member 2 and the shaft 2c are formed as an integral part. This configuration is chosen to decrease the number of parts and the number of assembly steps. Center B of the guide groove 2b is offset by a predetermined distance in the axial direction (toward the opening side of the joint in this embodiment) with respect to the center of curvature O of the outer circumferential surface 2a. The offset distance of the guide groove 2b is the same as the offset distance of the guide groove 1b of the outer joint member 1, but opposite in direction (the guide groove 1b being offset toward the innermost side, and the guide groove 2b being offset toward the opening side).

In this embodiment, as shown in FIG. 5, the cage 4 has three window-like pockets 4b that accommodate the balls 3. The inner circumferential surface 4a of the cage 4 has a region on the opening side formed in a cylindrical surface 4a1 and an inner region formed in a conical surface 4a2. Inner radius D5 of the cylindrical surface 4a1 is made equal to or larger than the outer radius D2 of the outer circumferential surface 2a of the inner joint member 2 (D5≧D2). The innermost region may also be a spherical surface or a cylindrical surface. The outer circumferential surface 4c of the cage 4 is a spherical surface (center of curvature at O) having radius D4. The cage 4 may be made of a metal, but may also be made of a resin in order to reduce the weight and cost.

Figure 6A:
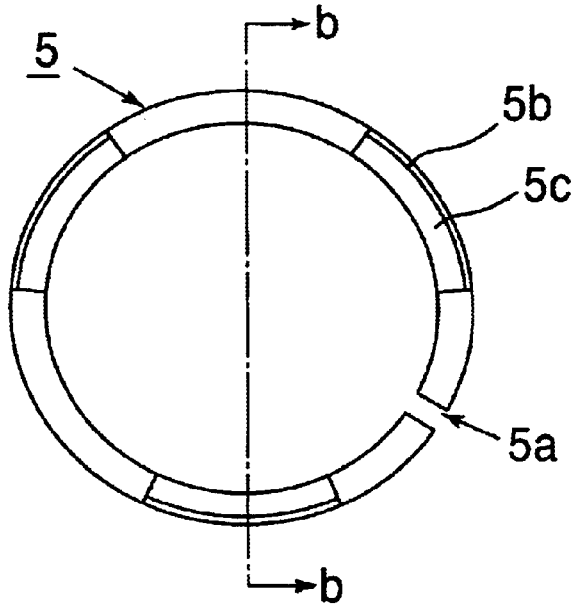
Figure 6B:
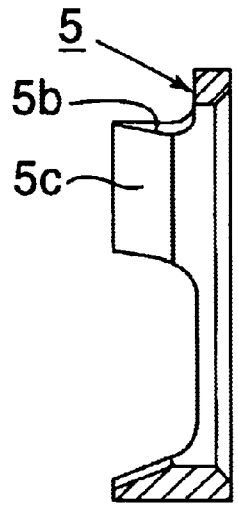

In this embodiment, as the elastic pressing means 5 a split ring that can freely contract and expand as shown in FIG. 6 is adopted. The elastic pressing means 5 is made of spring steel or the like, and has an opening 5a and three claws 5b that protrude in the axial direction. End of each of the claws 5b is formed in a concave spherical surface 5c having the same radius of curvature as that of the outer circumferential surface 2a of the inner joint member 2. The elastic pressing means 5 may also be made of an elastic material such as a resin, a rubber or the like.

FIGS. 7A–D show the process of assembling the constant velocity universal joint of this embodiment. The assembling process comprises a step of assembling the cage 4 into the inner circumferential surface 1a of the outer joint member 1 (step a as shown in FIG. 7A), a step of assembling the balls 3 into the pocket 4b of the cage 4 (step b as shown in FIG. 7B), a step of assembling the inner joint member 2 into the inner circumferential surface 4a of the cage 4, assembling the elastic pressing means 5 into the inner circumferential surface 4a of the cage 4 (cylindrical surface 4a1) and securing the elastic pressing means with a retainer ring 6 to prevent coming off thereof (step c as shown in FIG. 7C) resulting in the fully assembled joint (step d as shown in FIG. 7D).

In the assembling step a, since the opening side region of the inner circumferential surface 1a of the outer joint member 1 is the cylindrical surface 1a1 having radius D1 (≧D4), the cage 4 can be assembled into the outer joint member 1 by advancing in the axial direction with the axis of the cage 4 being aligned with the axis of the outer joint member 1. As a result, it is made easier to assemble the cage 4 compared to the case of the prior art process.

In the assembling step b, the balls 3 can be assembled into the pocket 4b directly from the inner circumferential side of the cage 4. As a result, it is made easier to assemble the balls 3 compared to the prior art process. Also because it is not necessary to make an angular displacement of the inner joint member 2 and the cage 4 with respect to the outer joint member 1 when assembling the balls 3, it is made possible to make the dimensions in the axial direction of the guide grooves 1b, 2b of the inner and outer joint members 1, 2 and the dimension of the pocket 4b of the cage 4 in the circumferential direction thereof smaller than those of the prior art. Consequently, the joint can be made lighter in weight and smaller in size, and the strength thereof (strength of cage) can be improved.

In the assembling step c, since the opening side region of the inner circumferential surface 4a of the cage 4 is the cylindrical surface 4a1 having radius D5 ($\geq$D2) and the center B of the guide groove 2b of the inner joint member 2 is offset toward the opening side, the inner joint member 2 can be assembled into the inner circumferential surface 4a of the cage 4 and the balls 3 by advancing the inner joint member 2 in the axial direction under such a state that the axis of the inner joint member 2 is aligned with the axes of the cage 4 and the outer joint member 1. Thus it is made easier to assemble the inner joint member 2 than in the case of prior art process. Also because the inner joint member 2 can be assembled after assembling the cage 4 and the balls 3 into the outer joint member 1, thus integrating the shaft 2c with the inner joint member 2 does not cause any difficulty in assembling.

In the assembling step d, the elastic pressing means 5 is assembled into the inner circumferential surface 4a (cylindrical surface 4a1) of the cage 4, and the outer circumferential surface 2a of the inner joint member is pressed toward the innermost side in the axial direction by the spherical surface 5c, with the retainer ring 6 applied to prevent the elastic pressing means 5 from coming off. Instead of using the retainer ring 6, the elastic pressing means 5 may also be secured to prevent it from coming off by such means as caulking the elastic pressing means 5 onto the cylindrical surface 4a1 of the cage 4, bonding (welding, etc.) and fitting engagement (for example, a projection provided on the elastic pressing means 5 is fitted in an engagement groove formed in the cylindrical surface 4a1 of the cage 4).

When the outer joint member 1, the inner joint member 2, the balls 3, the cage 4, and the elastic pressing means 5 have been assembled in the configuration described above, the constant velocity universal joint of this embodiment shown in FIG. 1 is completed. Center A of the guide groove 1b of the outer joint member 1 and center B of the guide groove 2b of the inner joint member 2 are offset on the opposite sides to each other (center A is offset toward the innermost side of the joint and center B is offset toward the opening of the joint) in the axial direction by the same distances with respect to the center plane O of the joint that includes the centers of the balls 3. Thus the ball track formed by the coordination of the guide groove 1b and the guide groove 2b has a wedge shape that expands toward the innermost side and gradually reduces toward the opening side.

Figure 2:
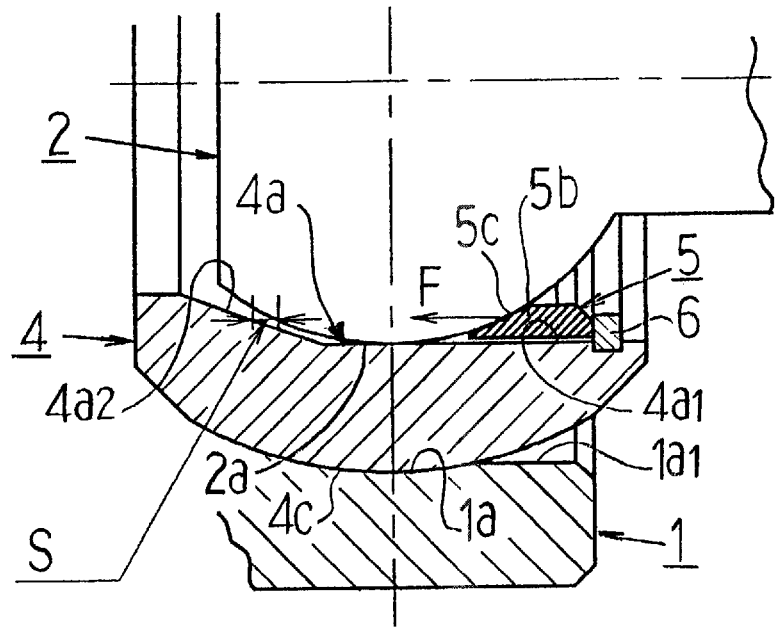
FIG. 2 is an enlarged longitudinal sectional view of portion X in FIG. 1.

As shown in FIG. 2 (enlarged view of portion X of FIG. 1), a clearance S is formed in the axial direction between the inner circumferential surface 4a of the cage 4 (conical surface 4a2) and the outer circumferential surface 2a of the inner joint member 2, thereby to allow a relative displacement of the inner joint member 2 in the axial direction with respect to the cage 4. The outer circumferential surface 2a of the inner joint member 2 is pressed to the side (innermost side) opposite to the offset direction (toward the opening) of center B of the guide groove 2b by the elastic force F of the elastic pressing means 5 that is interposed between the outer circumferential surface 2a of the inner joint member 2 and the inner circumferential surface 4a of the cage 4 (cylindrical surface 4a1). Under the elastic force F of the elastic pressing means 5, the inner joint member 2 makes a relative displacement in the axial direction opposite to the offset direction (innermost side) thereby to press the balls 3 and stops at a position where the inner gap between the balls 3 and the guide grooves 1b, 2b of the inner and outer joint members 1, 2 disappears. As a result, a certain amount of preload F is applied in the axial direction to the balls 3, thus eliminating the rotation backlash (play in the circumferential direction).

Figure 8:
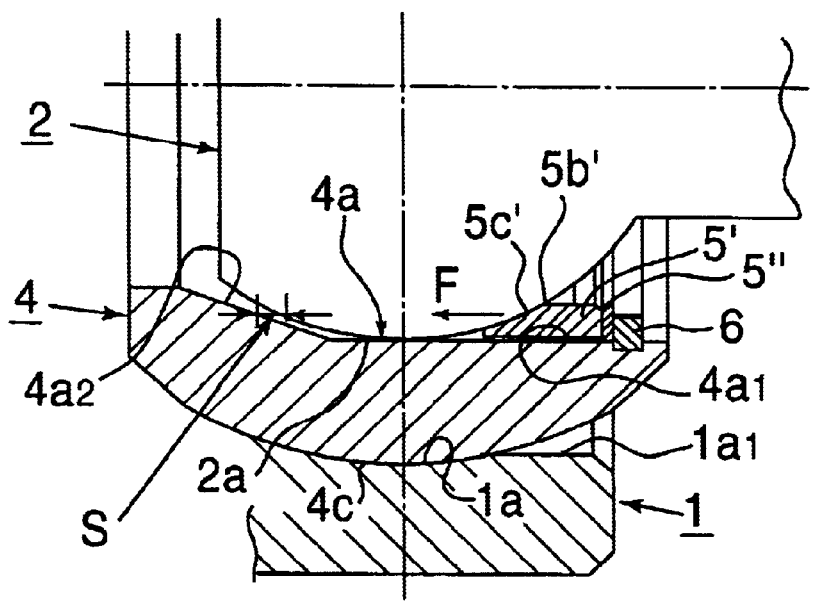
FIG. 8 is a partially enlarged longitudinal sectional view in modification of the first embodiment.

While the split ring is used as the elastic pressing means 5, an integral ring having a shape similar to that shown in FIG. 6 may also be used as long as a sufficient elastic force can be obtained. In this case, the elastic force required may be exerted by the elasticity of claws or a separate elastic ring 5" that complements the elasticity of claws 5b' of the integral ring 5' as shown in FIG. 8 may be provided. The elastic ring 5" is, for example, a corrugated plate spring, a rubber ring or a resin ring. The elastic ring 5" may also be used together with the split ring 5 shown in FIG. 6, or, alternatively, the elastic ring 5" may also be used together with a rigid ring (a ring which is not elastic) that makes contact with the outer circumferential surface 2a of the inner joint member 2. In this case, the elastic pressing means of the present invention consists of the combination of a pressing member (a member which is not elastic) that presses the outer circumferential surface of the inner joint member and an elastic member that applies an elastic force to the former member. The elastic pressing means of the present invention is not limited to ring shape and may be made of any material in any shape as long as the object of the present invention can be achieved.

By the first embodiment, the following effects can be obtained.

(1) The inner joint member makes a relative displacement in the axial direction opposite to the offset direction under the predetermined urging pressure of the elastic pressing means, thereby to press the balls, and applies a certain amount of preload in the axial direction to the balls. This eliminates the rotation backlash (play in the circumferential direction) of the joint. Also because the elastic pressing means has the spherical surface that fits and makes contact with the outer circumferential surface of the inner joint member, the surface pressure in the portion of contact between the outer circumferential surface of the inner joint member and the elastic pressing means is reduced and the outer circumferential surface of the inner joint member can be guided by the spherical surface.

(2) By making the ball track in such a configuration that is gradually reduced toward the opening side of the joint, and forming the cylindrical surface that fits with the outer circumferential surface of the inner joint member at least in the region on the opening side of the inner circumferential surface of the cage with the elastic pressing means being disposed on the cylindrical surface, it is made possible to assemble the inner joint member easily. Also because the inner joint member can be assembled after assembling the cage and the balls into the outer joint member, the inner joint member and the shaft can be integrated thereby reducing the number of parts and the number of assembling steps.

(3) Since it is not necessary to make an angular displacement of the inner joint member and the cage with respect to the outer joint member when assembling the balls, dimension of the guide grooves of the inner and outer joint members in the axial direction can be made smaller than those in the prior art and the size in the circumferential direction of the pocket of the cage can be made smaller than those in the prior art. Thus the joint can be made lighter in weight and smaller in size, and the strength (strength of cage) can be increased.

(4) By forming the region on the opening side of the inner circumferential surface of the outer joint member in a cylindrical surface that fits with the outer circumferential surface of the cage, it is made easier to assemble the cage into the outer joint member.

As shown in FIG. 9, the constant velocity universal joint of second embodiment comprises an outer joint member 1 that has, for example, three curved guide grooves 1b formed in the axial direction on a spherical inner circumferential surface 1a thereof, an inner joint member 2 that has, for example, three curved guide grooves 2b formed in the axial direction on a spherical outer circumferential surface 2a thereof, for example, three balls 3 disposed in ball tracks that are formed by the coordination of the guide grooves 1b of the outer joint member 1 and the guide grooves 2b of the inner joint member 2, a cage 4 that holds the balls 3, and a retaining member 5 interposed between the outer circumferential surface 2a of the inner joint member 2 and the inner circumferential surface 4a of the cage 4.

Figure 11:
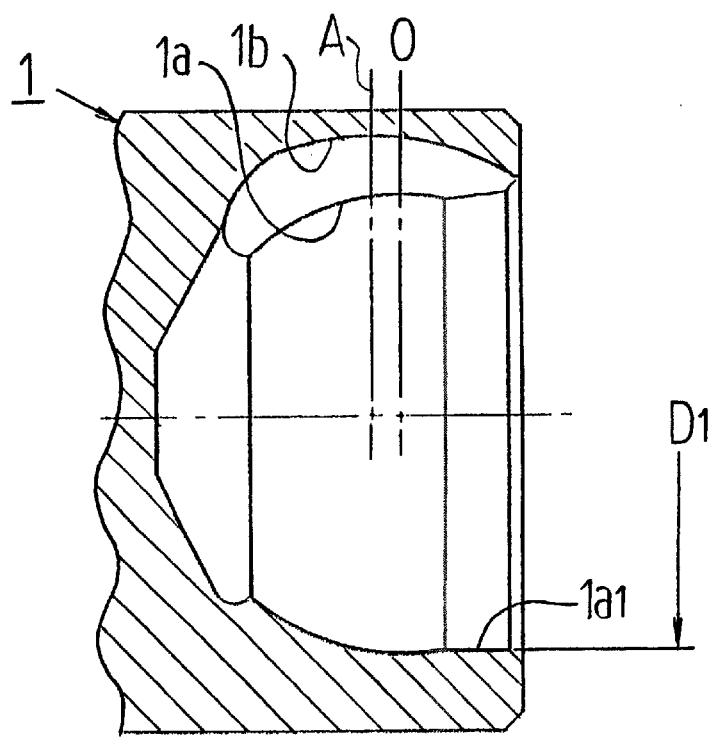
FIG. 11 is a longitudinal sectional view showing an outer joint member.

As shown in FIG. 11, the outer joint member 1 has a cup shape that opens at one end thereof and is provided with either a shaft formed integrally therewith at the other end not shown or a separate shaft being bonded thereto by proper means. Center A of the guide groove 1b is offset by a predetermined distance in the axial direction (toward the innermost side of the joint in this embodiment) with respect to the center of curvature O of the inner circumferential surface 1a. A region on the opening side of the inner circumferential surface 1a is formed in a cylindrical surface 1a1. Inner radius D1 of the cylindrical surface 1a1 is set to such a value that is capable of enclosing the profile of the cage 4 shown in FIG. 13(a) in conjunction with a recess of the guide groove 1b of the outer joint member 1.

Figure 12:
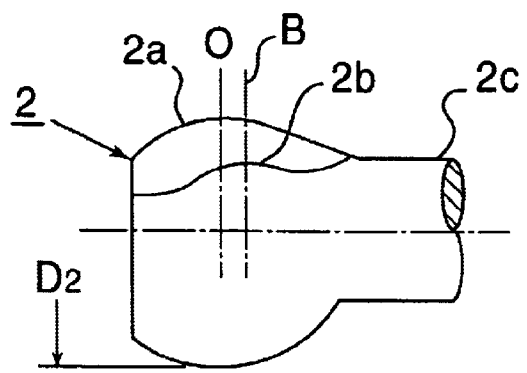
FIG. 12 is a longitudinal sectional view showing an inner joint member.

In this embodiment, as shown in FIG. 12, the inner joint member 2 and the shaft 2c are formed as an integral part. This configuration is chosen to decrease the number of parts and the number of assembly steps. Center B of the guide groove 2b is offset by a predetermined distance in the axial direction (toward the opening side of the joint in this embodiment) with respect to the center of curvature O of the outer circumferential surface 2a. The offset distance of the guide groove 2b is the same as the offset distance of the guide groove 1b of the outer joint member 1, but is opposite in direction (the guide groove 1b being offset toward the innermost side, and the guide groove 2b being offset toward the opening side).

Figure 13A:
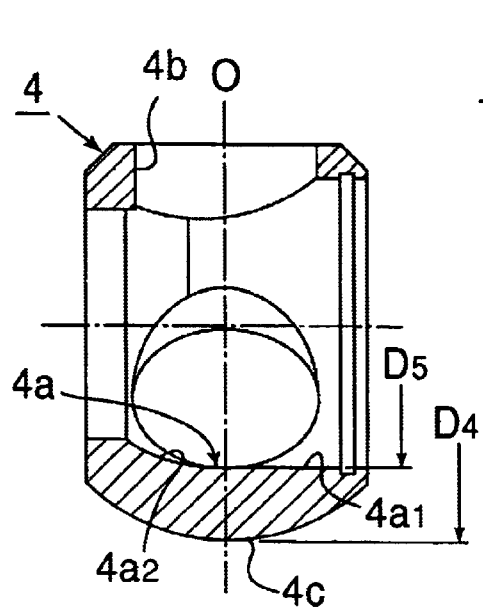
Figure 13B:
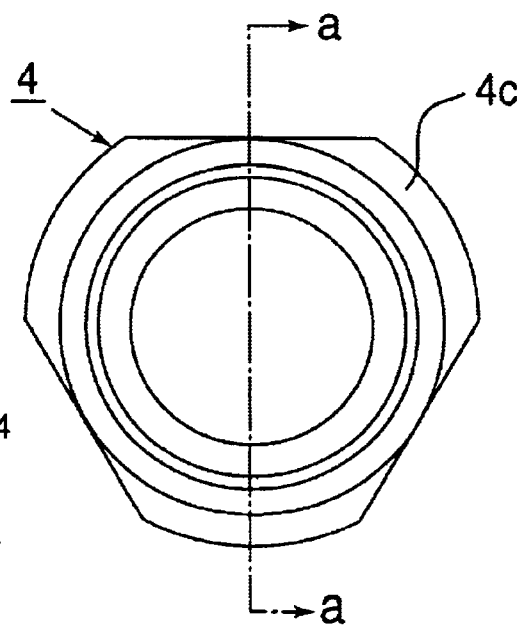

In this embodiment, as shown in FIG. 13, the cage 4 has three window-like pockets 4b that accommodate the balls 3. The inner circumferential surface 4a of the cage 4 has a region on the opening side which is formed in a cylindrical surface 4a1 and an innermost side region which is formed in a spherical surface 4a2 (center of curvature at O). Inner radius D5 of the cylindrical surface 4a1 is made equal to or larger than the outer radius D2 of the outer circumferential surface 2a of the inner joint member 2 (D5≧D2). The innermost side region may also be formed in a conical surface or a cylindrical surface. The outer circumferential surface 4c of the cage 4 is a spherical surface (center of curvature at O) having radius D4. The cage 4 may be made of a metal, but may also be made of a resin in order to further reduce the weight and cost.

Figure 14A:
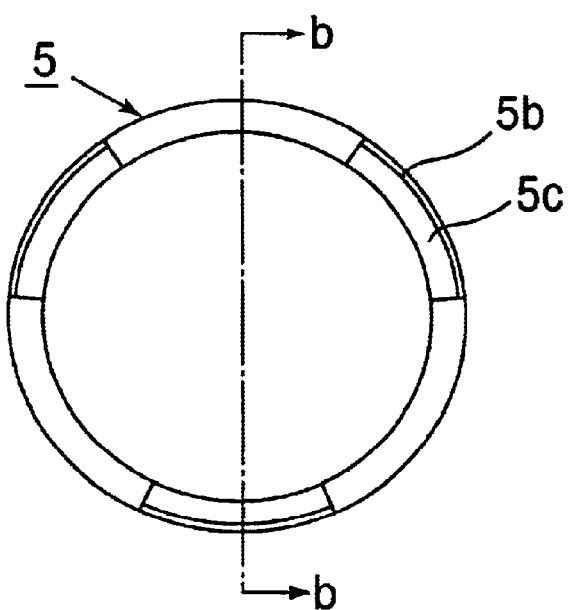
Figure 14B:
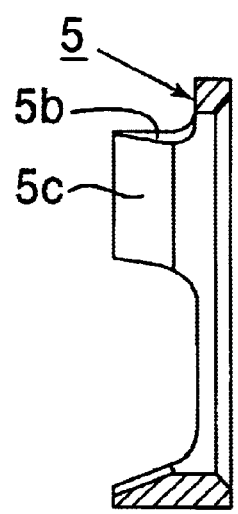

In this embodiment, a ring as shown in FIG. 14 is adopted as the retaining member 5. The retaining member 5 is made of steel or the like, and has three claws 5b that protrude in the axial direction. End of each of the claws 5b is formed in a concave spherical surface 5c having the same radius of curvature as that of the outer circumferential surface 2a of the inner joint member 2. The retaining member 5 may also be made of a resin or the like.

FIGS. 15A–D show the process of assembling the constant velocity universal joint of this embodiment. The assembling process comprises a step of assembling the cage 4 into the inner circumferential surface 1a of the outer joint member 1 (step a as shown in FIG. 15A), a step of assembling the balls 3 into the pocket 4b of the cage 4 (step b as shown in FIG. 15B), a step of assembling the inner joint member 2 into the inner circumferential surface 4a of the cage 4, assembling the retaining member 5 into the inner circumferential surface 4a (cylindrical surface 4a1) of the cage 4 and securing with a retainer ring 6 to prevent the assembly from coming off (step c as shown in FIG. 15C) resulting in the fully assembled joint (step d as shown in FIG. 15D).

In the assembling step a, since the opening side region of the inner circumferential surface 1a of the outer joint member 1 has the cylindrical surface 1a1 that can enclose the profile of the cage 4 shown in FIG. 13(a), the cage 4 can be assembled into the outer joint member 1.

In the assembling step b, the balls 3 can be assembled into the pocket 4b directly from the inner circumferential side of the cage 4. As a result, it is made easier to assemble the balls 3 compared to the prior art process. Also because it is not necessary to make an angular displacement of the inner joint member 2 and the cage 4 with respect to the outer joint member 1 when assembling the balls 3, it is made possible to make the dimensions in the axial direction of the guide grooves 1b, 2b of the inner and outer joint members 1, 2 smaller than those of the prior art and make the dimension of the pocket 4b of the cage 4 in the circumferential direction thereof smaller than that of the prior art. Consequently, the joint can be made lighter in weight and smaller in size, and the strength thereof (strength of cage) can be increased.

In the assembling step c, since the opening side region of the inner circumferential surface 4a of the cage 4 has the cylindrical surface 4a1 having radius D5 (≧D2) and the center B of the guide groove 2b of the inner joint member 2 is offset toward the opening side, thus the inner joint member 2 can be assembled into the inner circumferential surface 4a of the cage 4 and the balls 3 by advancing the inner joint member 2 in the axial direction under such a state that the axis of the inner joint member 2 is aligned with the axes of the cage 4 and the outer joint member 1. Thus it is made easier to assemble the inner joint member 2 than in the case of the prior art process. Also because the inner joint member 2 can be assembled after assembling the cage 4 and the balls 3 into the outer joint member 1, thus integrating the shaft 2c with the inner joint member 2 does not cause any difficulty in assembling.

In the assembling step d, the retaining member 5 is assembled into the inner circumferential surface 4a (cylindrical surface 4a1) of the cage 4, and the spherical portion 5c thereof is fitted with the outer circumferential surface 2a of the inner joint member 2, with the retainer ring 6 applied to prevent the assembly from coming off. Instead of using the retainer ring 6, the retaining member 5 may also be secured to prevent it from coming off by such means as caulking the retaining member 5 onto the cylindrical surface 4a1 of the cage 4, bonding (welding, etc.) and fitting engagement (for example, a projection provided on the retaining member 5 is fitted in an engagement groove formed in the cylindrical surface 4a1 of the cage 4).

When the outer joint member 1, the inner joint member 2, the balls 3, the cage 4, and the retaining member 5 have been assembled in the configuration described above, the constant velocity universal joint of this embodiment shown in FIG. 9 is completed. Center A of the guide groove 1b of the outer joint member 1 and center B of the guide groove 2b of the inner joint member 2 are offset on the opposite sides to each other (center A is offset toward the innermost side of the joint and center B is offset toward the opening of the joint) in the axial direction by the same distances with respect to the center plane O of the joint that includes the centers of the balls 3. Thus the ball tracks formed by the coordination of the guide grooves 1b and the guide grooves 2b has a wedge shape that expands toward the innermost side and gradually reduces toward the opening.

Figure 10:
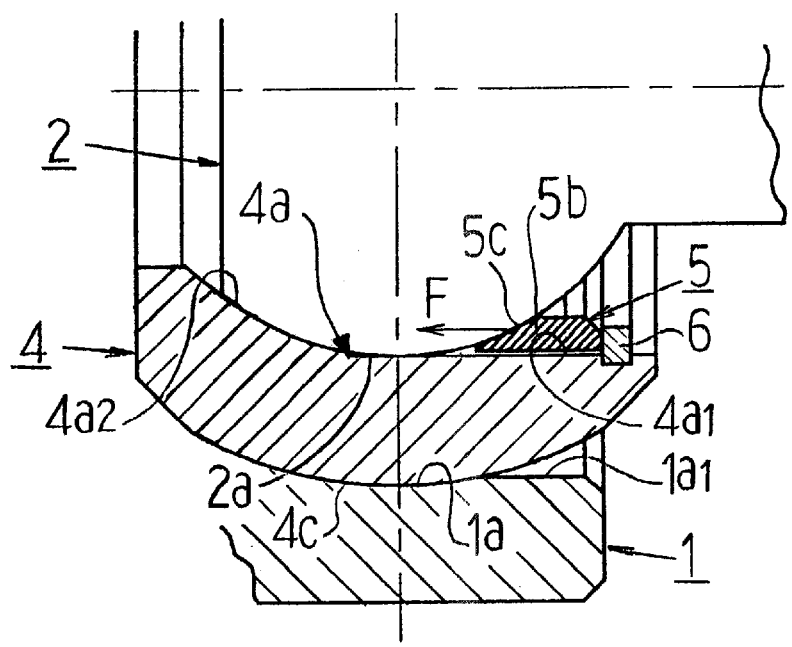
FIG. 10 is an enlarged longitudinal sectional view of portion X in FIG. 9.

As shown in FIG. 10 (enlarged view of portion X of FIG. 9), the inner joint member 2 assembled into the inner circumferential surface 4a of the cage 4 is retained and held in place by the retaining member 5. The outer circumferential surface 2a of the inner joint member 2 is guided by the spherical surface 4a2 of the cage 4 and the spherical portion 5c of the retaining member 5 during angular displacement of the joint.

While an integral ring is used as the retaining member in this embodiment, a split ring (split at one position or at a plurality of positions) having a shape similar to that shown in FIG. 14 may also be used as long as the required force of retention can be obtained. The retaining member may also be pressed toward the inner joint member by an elastic member such as a corrugated plate spring, a rubber ring or a resin ring. Moreover, the retaining member of the present invention is not limited to a ring shape and may be made of any material in any shape as long as the object of the present invention can be achieved.

By the second embodiment, the following effects can be obtained.

(1) The inner joint member can be assembled more easily by providing the cylindrical surface, that fits the outer circumferential surface of the inner joint member, in at least the opening side region of the inner circumferential surface of the cage, and disposing the retaining member on the cylindrical surface. Also because the inner joint member can be assembled after assembling the cage and the balls into the outer joint member, it is made possible to integrate the shaft with the inner joint member and reduce the number of parts and the number of assembly steps. Further, because the retaining member has the spherical surface that makes fitting contact with the outer circumferential surface of the inner joint member, the outer circumferential surface of the inner joint member can be guided by the spherical surface.

(2) Since it is not necessary to make an angular displacement of the inner joint member and the cage with respect to the outer joint member when assembling the balls, dimensions of the guide grooves of the inner and outer joint members in the axial direction can be made smaller than those in the prior art and the size in the circumferential direction of the pocket of the cage can be made smaller than that in the prior art. Thus the joint can be made lighter in weight and smaller in size, and the strength (strength of cage) can be increased.

(3) By forming the region on the opening side of the inner circumferential surface of the outer joint member in a cylindrical surface that fits with the outer circumferential surface of the cage, it is made easier to assemble the cage into the outer joint member.

Figure 16:
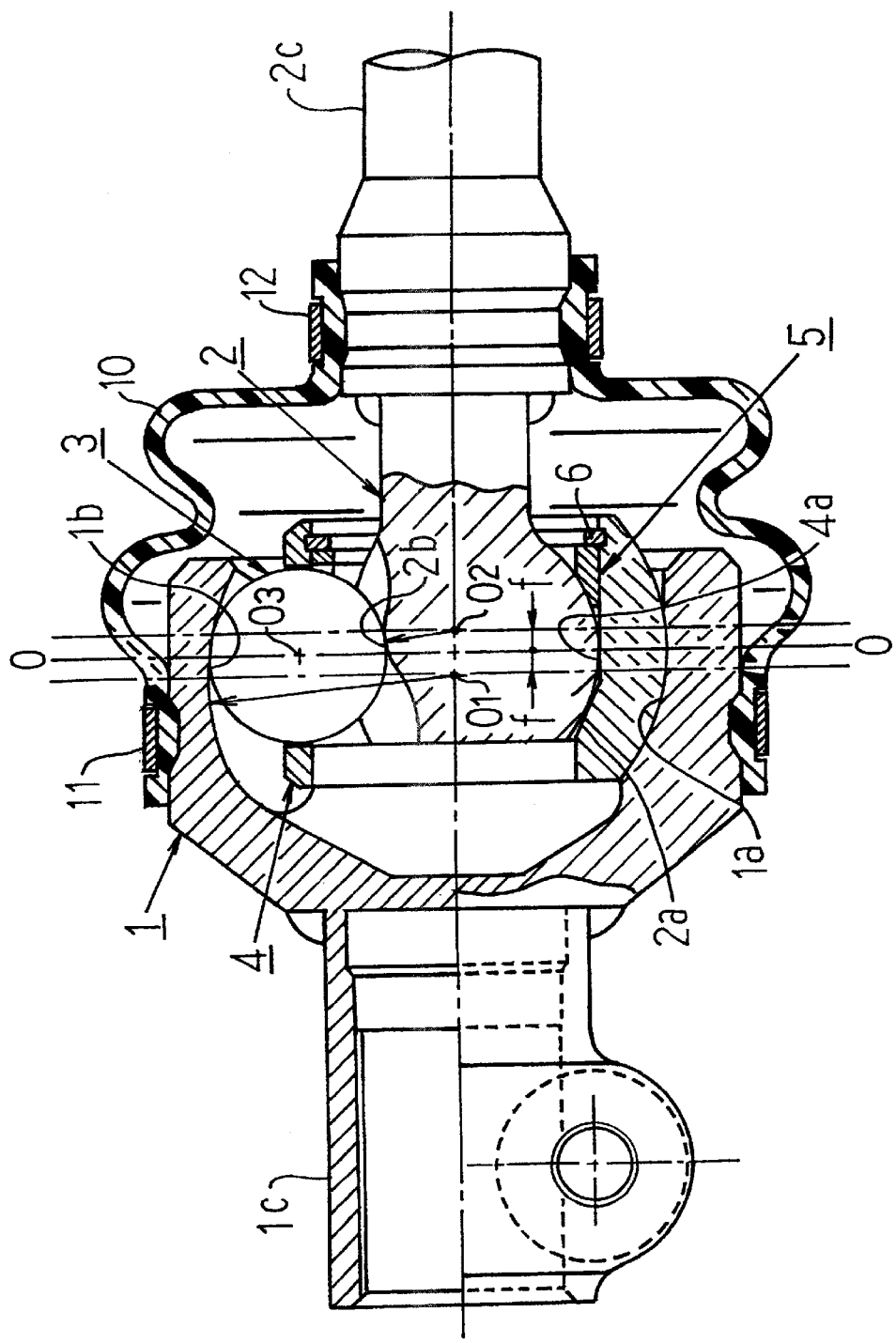
FIG. 16 is a longitudinal sectional view of the constant velocity universal joint of third embodiment.
Figure 17:
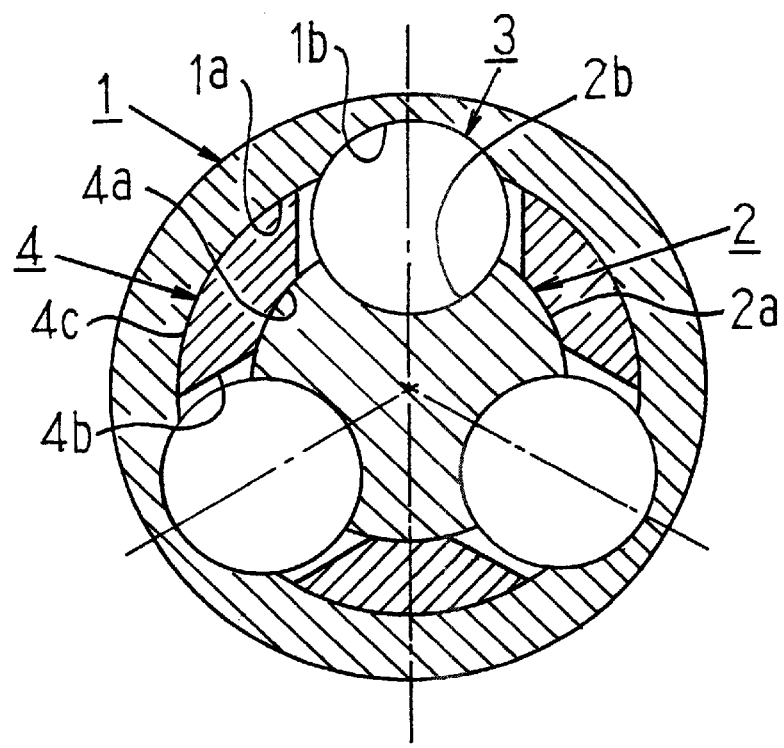
FIG. 17 is a cross sectional view taken along line O—O in FIG. 16 (boot is omitted).
Figure 34:
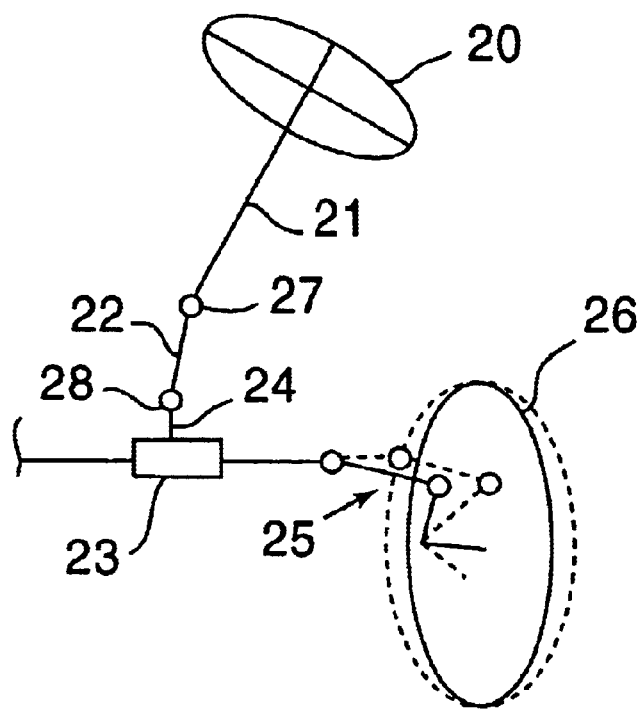
FIG. 34 shows schematically an example of the automobile steering apparatus.

The constant velocity universal joint of third embodiment shown in FIG. 16 and FIG. 17 connects an intermediate shaft (22) and a gear shaft (24) of a steering gear (23) to be capable of freely making angular displacement in, for example, an automobile steering apparatus shown in FIG. 34.

The constant velocity universal joint of this embodiment comprises an outer joint member 1 that has, for example, three curved guide grooves 1b formed in the axial direction on a spherical inner circumferential surface 1a thereof, an inner joint member 2 that has, for example, three curved guide grooves 2b formed in the axial direction on a spherical outer circumferential surface 2a thereof, for example, three torque transmitting balls 3 disposed in ball tracks that are formed by the coordination of the guide grooves 1b of the outer joint member 1 and the guide grooves 2b of the inner joint member 2 that oppose the former, a cage 4 that holds the torque transmitting balls 3, and an elastic member 5 interposed between the outer circumferential surface 2a of the inner joint member 2 and the inner circumferential surface 4a of the cage 4.

Figure 19:
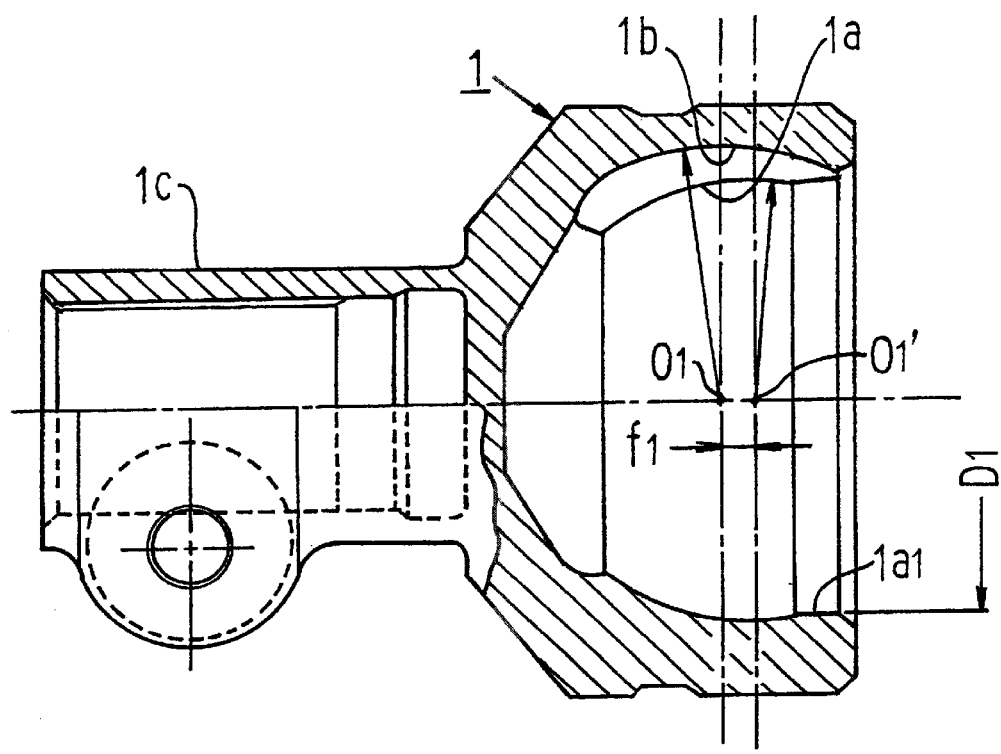
FIG. 19 is a longitudinal sectional view (partially side view) of the outer joint member.

As shown in FIG. 19, the outer joint member 1 of this embodiment has a cup shape that opens at one end thereof and is provided with a yoke 1c formed integrally therewith at the other end thereof for connecting a gear shaft (for example, a pinion shaft) of a steering gear (for example, a rack and pinion type steering gear). By integrally forming the outer joint member 1 and the yoke 1c, it is made possible to reduce the number of manufacturing processes, the number of parts and the number of assembly steps and reduce the cost. Concentricity of both members can also be ensured.

Figure 21A:
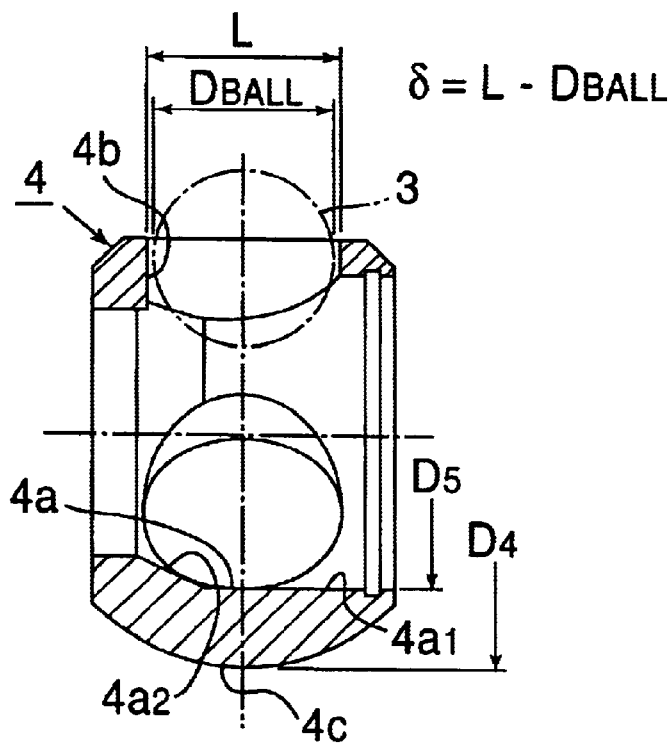

The center of curvature O1 of the guide groove 1b is offset by the predetermined distance f1 from the center of curvature O1' of the spherical inner circumferential surface 1a to one side (toward the innermost side of the joint in this embodiment) in the axial direction. A region on the opening side of the inner circumferential surface 1a is formed in a cylindrical surface 1a1. Inner radius D1 of the cylindrical surface 1a1 is set to such a value that is capable of enclosing the outer diameter of the cage 4 (direction shown in FIG. 21(a)) to be described later.

The outer joint member 1 is preformed roughly to a predetermined shape from steel in hot forging or semi-hot forging process, while the inner circumferential surface 1a and the guide groove 1b are formed in cold forging process. While the inner circumferential surface 1a is further subjected to a post process (grinding process or the like) to ensure accuracy, the cold forging process described above may be regarded as the final finishing process for the guide groove 1b. In this case, surface of the guide groove 1b constitutes the surface of the final product that has been formed by cold forging. Since this makes the post processing (grinding, etc.) of the guide groove unnecessary, manufacturing cost for the outer joint member is reduced in comparison to the prior art.

Figure 20:
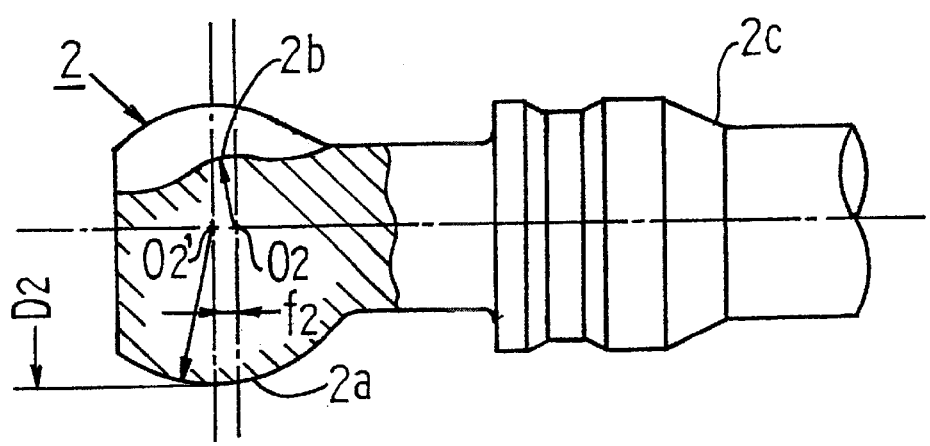
FIG. 20 is a longitudinal sectional view (partially side view) of the inner joint member.

In this embodiment, as shown in FIG. 20, the inner joint member 2 has the shaft 2c that serves also as the intermediate shaft (22: refer to FIG. 34) being integrally formed therewith. Forming the shaft 2c integrally with the inner joint member 2 makes it possible to reduce the number of manufacturing processes, the number of parts and the number of assembly steps and reduce the cost.

The center of curvature O2 of the guide groove 2*b* is offset by a predetermined distance f2 from the center of curvature O2' of the spherical outer circumferential surface 2*a* to the other side (toward the opening of the joint in this embodiment) in the axial direction. Direction of offset of the guide groove 2*b* is opposite to that of the guide groove 1*b* of the outer joint member 1 (the guide groove 1*b* is offset toward the innermost side, and the guide groove 2*b* is offset toward the opening). In this embodiment, the offset distance f2 of the guide groove 2*b* is set to be smaller than the offset distance f1 of the guide groove 1*b* of the outer joint member 1 by a predetermined amount (f1>f2).

The inner joint member 2 is preformed roughly to a predetermined shape from steel in, for example, hot forging or semi-hot forging process, while the outer circumferential surface 2*a* and the guide groove 2*b* are formed in cold forging process. While the outer circumferential surface 2*a* is subjected to a post process (grinding process or the like) to ensure accuracy, the cold forging process described above may be regarded as the final finishing process for the guide groove 2*b*. In this case, surface of the guide groove 2*b* makes the surface of the final product that has been formed by cold forging. Since this makes the post processing (grinding, etc.) of the guide groove unnecessary, manufacturing cost of the inner joint member is reduced in comparison to the prior art.

Figure 21B:
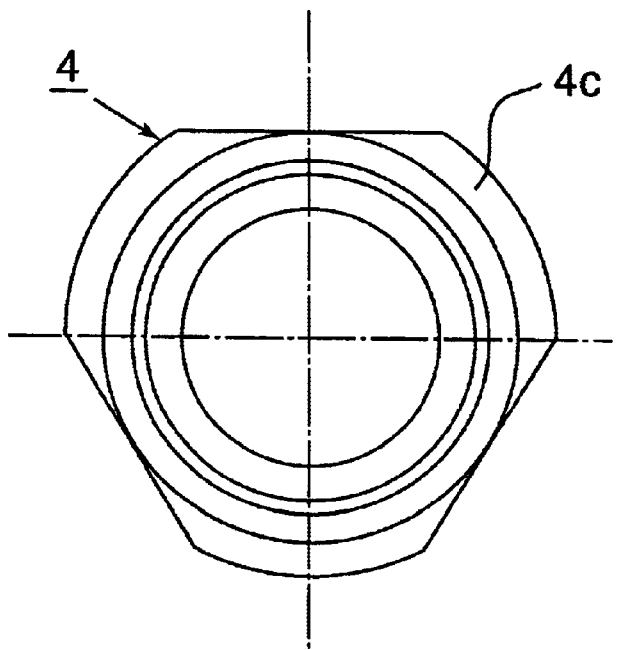

In this embodiment, as shown in FIG. 21, the cage 4 has three window-like pockets 4*b* that accommodate the torque transmitting balls 3. The inner circumferential surface 4*a* of the cage 4 has a region on the opening side that is formed in a cylindrical surface 4*a*1 and an innermost side region formed in a conical surface 4*a*2. Inner radius D5 of the cylindrical surface 4*a*1 is made larger than the outer radius D2 of the outer circumferential surface 2*a* of the inner joint member 2 (D5>D2). The innermost side region may also be formed in a spherical surface or a cylindrical surface. The outer circumferential surface 4*c* of the cage 4 is a spherical surface having radius D4. The cage 4 may be made of a metal, but may also be made of a resin in order to further reduce the weight and cost.

In this embodiment, dimension L in the axial direction of the pocket 4*b* of the cage 4 is equal to or greater than diameter $D_{BALL}$ of the torque transmitting balls 3 accommodated therein ($L \geq D_{BALL}$). Clearance $\delta$ ($=L-D_{BALL}$) of the pocket in the axial direction between the pocket 4*b* and the torque transmitting balls 3 may be set, for example, in a range of $0 \leq \delta \leq 55$ μm. This setting makes it possible to reduce the resistance to the rotation when the joint transmits the rotation torque while taking a certain operating angle and prevent the joint from losing the constant velocity characteristics, thereby to achieve good feel of rotation (smoothness of rotation).

Figure 22A:
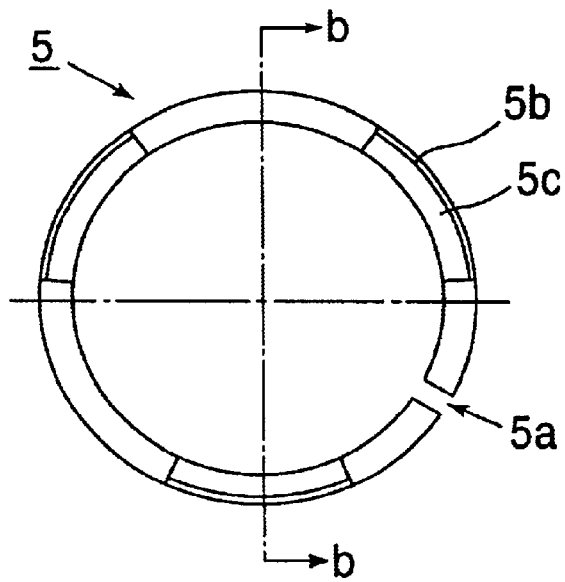
Figure 22B:
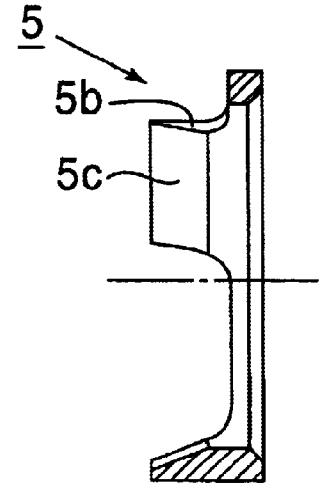

In this embodiment, a split ring that can increase and decrease the diameter thereof as shown in FIG. 22 is adopted as the elastic member 5. The elastic member 5 is made of spring steel or the like, and has one opening 5*a* and three claws 5*b* that protrude in the axial direction. End of each of the claws 5*b* is formed in a concave spherical surface 5*c* having the same radius of curvature as that of the outer circumferential surface 2*a* of the inner joint member 2. The elastic member 5 may also be made of an elastic material such as resin or rubber. The elastic member 5 may also be made in an integral ring without the split gap 5*a*. In this case, the elastic force required may be provided by the elasticity of the claws (5*b*), or by the combined use of an elastic ring such as a corrugated plate spring, a rubber ring or a resin ring. Further, the end portion (5*c*) of the claw (5*b*) may be formed in such a shape that makes linear contact with the outer circumferential surface 2*a* of the inner joint member 2, for example a conical shape (conical surface).

The constant velocity universal joint of this embodiment is assembled through a step of assembling the cage 4 into the inner circumferential surface 1*a* of the outer joint member 1, a step of assembling the torque transmitting balls 3 into the pocket 4*b* of the cage 4, a step of assembling the inner joint member 2 into the inner circumferential surface 4*a* of the cage 4, and a step of assembling the elastic member 5 into the inner circumferential surface 4*a* (cylindrical surface 4*a*1) of the cage 4 and securing with a retainer ring 6 to prevent the assembly from coming off. Since the region on the opening side of the inner circumferential surface 1*a* of the outer joint member 1 has the cylindrical surface 1*a*1 that can enclose the profile of the cage 4 (direction shown in FIG. 21(*a*)), the cage 4 can be easily assembled into the outer joint member 1. Also the torque transmitting balls 3 can be assembled into the pocket 4*b* directly from the inner circumferential side of the cage 4. Moreover, since the region on the opening side of the inner circumferential surface 4*a* of the cage 4 has the cylindrical surface 4*a*1 having radius D5 (>D2) and the center of curvature O2 of the guide groove 2*b* of the inner joint member 2 is offset toward the opening side, the inner joint member 2 can be assembled into the inner circumferential surface 4*a* of the cage 4 and the torque transmitting balls 3 by advancing the inner joint member 2 in the axial direction under such a state that the axis of the inner joint member 2 is aligned with the axes of the cage 4 and the outer joint member 1. The elastic member 5 is assembled into the inner circumferential surface 4*a* (cylindrical surface 4*a*1) of the cage 4, and the outer circumferential surface 2*a* of the inner joint member 2 is pressed toward the inside of the joint in the axial direction by the spherical portion (or conical portion) 5*c* of the elastic member 5, with the retainer ring 6 applied for retention. Instead of using the retainer ring 6, the elastic member 5 may also be secured to prevent it from coming off by such means as caulking the elastic member 5 onto the cylindrical surface 4*a*1 of the cage 4, bonding (welding, etc.) and fitting engagement (for example, a projection provided on the elastic member 5 is fitted in an engagement groove formed in the cylindrical surface 4*a*1 of the cage 4).

When the outer joint member 1, the inner joint member 2, the torque transmitting balls 3, the cage 4, and the elastic member 5 have been assembled in the configuration described above, the constant velocity universal joint of this embodiment shown in FIG. 16 and FIG. 17 is completed. A boot 10 is applied on the outer circumference of the outer joint member 1 and on the outer circumference of the shaft 2*c* of the inner joint member 2, and is clamped by means of boot bands 11, 12.

Figure 18:
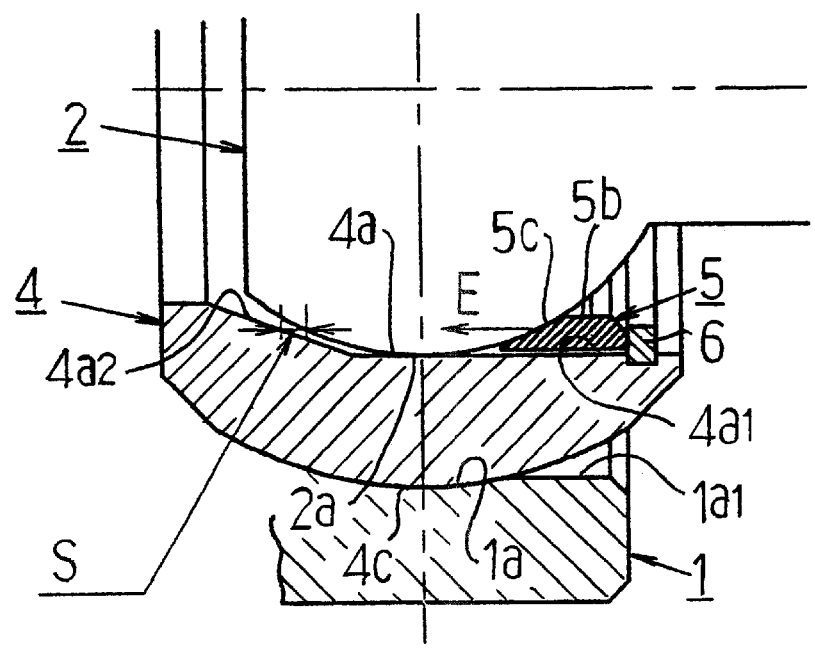
FIG. 18 is an enlarged longitudinal sectional view of a key portion in FIG. 1.

As shown in an enlarged view of FIG. 18, a clearance S is provided in the axial direction between the inner circumferential surface 4*a* (conical surface 4*a*2) of the cage 4 and the outer circumferential surface 2*a* of the inner joint member 2, thereby to allow a relative displacement of the inner joint member 2 in the axial direction with respect to the cage 4 (and the outer joint member 1). The axial clearance S and the elastic member 5 constitute the preloading means.

Elastic force E of the elastic member 5, that is interposed between the outer circumferential surface 2*a* of the inner joint member 2 and the inner circumferential surface 4*a* (cylindrical surface 4*a*1) of the cage 4, presses the outer circumferential surface 2*a* of the inner joint member 2 in the direction(toward the innermost side of the joint) opposite to the direction (toward the opening of the joint) of offset of the center of curvature O2 of the guide groove 2*b*. Under the pressing force E of the elastic member 5, the inner joint member 2 undergoes a relative displacement in the axial direction in the direction (toward the innermost side of the joint) opposite to the direction of offset of the center of curvature O2, thereby to press the torque transmitting balls 3, and stops at a position where the clearance between the torque transmitting balls 3 and the guide grooves 1b, 2b of the outer and inner joint members 1, 2 disappears. As a result, a certain amount of preload E is applied in the axial direction to the torque transmitting balls 3, thus eliminating the rotation backlash (play in the circumferential direction).

In this embodiment, as described previously, the offset distance f1 (offset with respect to the center of curvature O1') of the guide groove 1b of the outer joint member 1 is set to be larger than the offset distance f2 (offset with respect to the center of curvature O2') of the guide groove 2b of the inner joint member 2 by a predetermined amount (f1>f2). Consequently, in the state after assembly shown in FIG. 16 (state where the inner clearance is reduced by the preloading means), center of curvature O1 of the guide groove 1b of the outer joint member 1 and center of curvature O2 of the guide groove 2b of the inner joint member 2 are offset on the opposite sides to each other (center of curvature O1 is offset toward the innermost side of the joint and center of curvature O2 is offset toward the opening of the joint) in the axial direction by the same distances f with respect to the center plane O of the joint that includes the centers O3 of the torque transmitting balls 3. Specifically, assuming the state before the clearance is reduced by the preloading means, the torque transmitting balls 3 have a predetermined amount of play (inner clearance) toward the expanding side of the ball track, namely in the direction of offset of the center of curvature O1 (direction of approaching the center of curvature O1: direction in which the offset distance f1 apparently decreases) with respect to the guide groove 1b, and in the direction opposite to the offset of the center of curvature O2 (direction of departing from the center of curvature O2: direction in which the offset distance f2 apparently increases) with respect to the guide groove 2b, taking reference to a position where the balls make contact with both the guide groove 1b and the guide groove 2b (position where there is no inner clearance). Therefore, by setting the offset distance f1 larger than the offset distance f2 by a predetermined amount (f1>f2), it is made possible to cancel the variations of the center of curvature O1 and/or the center of curvature O2 with respect to the center plane O of the joint in the preloading process so that, when the inner clearance is reduced by the preloading means, the center of curvature O1 and the center of curvature O2 are offset to the opposite sides by the same distances f in the axial direction with respect to the center plane O of the joint. Thus the ball tracks formed by the coordination of the guide grooves 1b and the guide grooves 2b are formed in a wedge shape that gradually reduces toward the other side (opening side) in the axial direction. When the outer joint member 1 and the inner joint member 2 make an angular displacement of θ, the torque transmitting balls 3 which are guided by the cage 4 are always held in the bisecting plane (θ/2) of the angle θ regardless of the value of the operating angle θ. As a result, constant velocity characteristics of the joint can be ensured and good feel of rotation (smoothness of rotation) is achieved.

Figure 23:
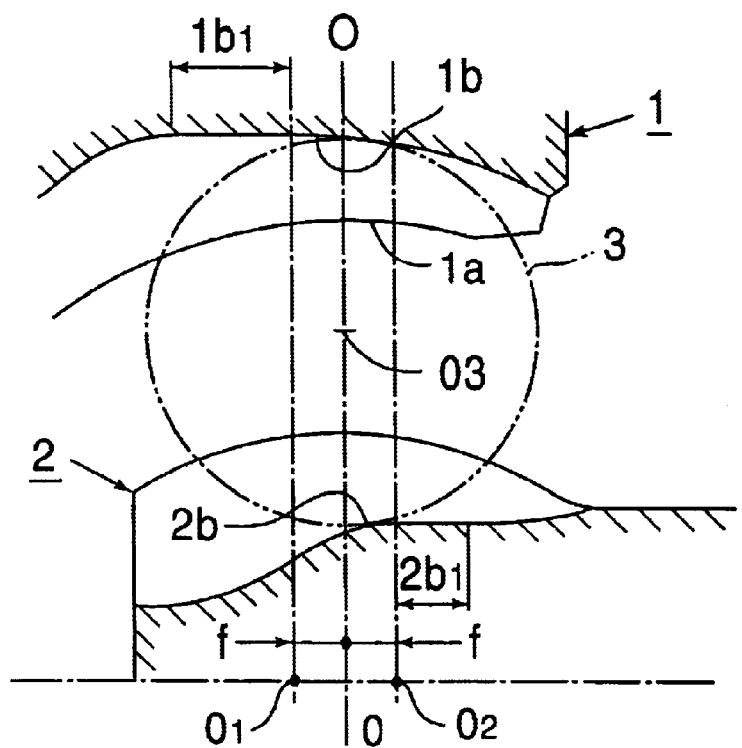
FIG. 23 is an enlarged sectional view of a key portion of the constant velocity universal joint according to modification of the third embodiment.

FIG. 23 shows a modification of the third embodiment. In this embodiment, the guide grooves 1b of the outer joint member 1 and the guide grooves 2b of the inner joint member 2 have regions 1b1, 2b1 that are free of undercut being provided thereon. For example, the region 1b1 is provided in the joint on the innermost side of the center line O1 of the guide groove 1b and is parallel to the center line of the outer joint member 1. The region 2b1 is provided in the joint on the opening side of the center line O2 of the guide groove 2b and is parallel to the center line of the inner joint member 2. By providing the regions 1b1, 2b1 that are free of undercut, the operating angle of the joint can be increased.

Figure 24:
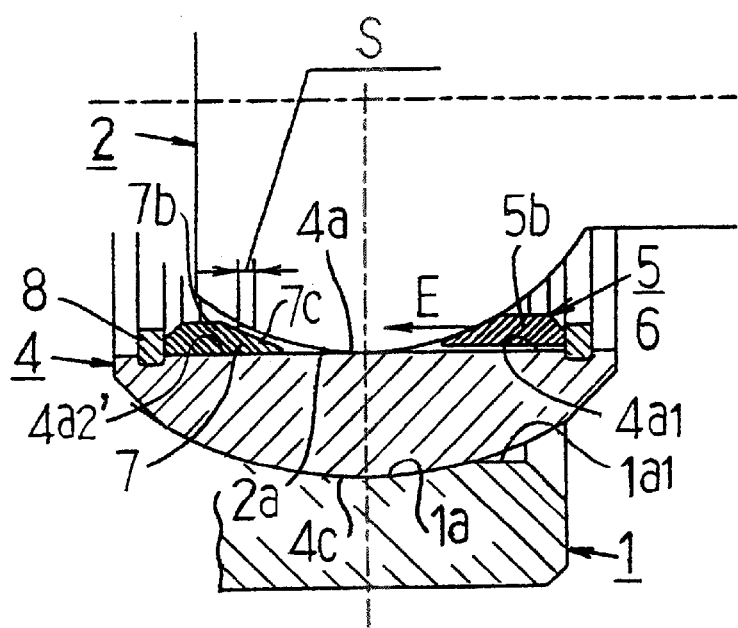
FIG. 24 is an enlarged sectional view of a key portion of the constant velocity universal joint according to another modification of the third embodiment.

FIG. 24 shows another modification of the third embodiment of the present invention. In this embodiment, the entire region of the inner circumferential surface 4a of the cage 4 is formed in a cylindrical surface, and the elastic member 5 is mounted in the opening side region 4a1 of the inner circumferential surface 4a while an auxiliary ring 7 is mounted in the innermost side region 4a2' of the inner circumferential surface 4a. The auxiliary ring 7 is, for example, an integral ring that has claws 7b and spherical portions (or conical portions) 7c similarly to the elastic member 5 described previously, and is fitted in the innermost side region 4a2' and fastened by a retainer ring 8. The clearance S is provided in the axial direction between the spherical surface (or conical surface) 7c of the auxiliary ring 7 and the outer circumferential surface 2a of the inner joint member 2. The clearance S of the axial direction and the elastic member 5 constitute the preloading means. This constitution has an advantage that the configuration of the cage 4 can be mode simpler than in the embodiment described above.

In the automotive steering apparatus shown in FIG. 34, a constant velocity universal joint similar to that of the embodiments described above may be used as a universal joint (28) that connects the main shaft (21) and the intermediate shaft (22) while allowing it to make angular displacement freely.

By the third embodiment, the following effects can be obtained.

(1) Since the preloading means is provided to reduce the clearance between the torque transmitting balls and the ball track, rotation backlash (play in the circumferential direction) does not take place.

(2) When the clearance is reduced by the preloading means, the center of curvature of the guide groove of the outer joint member and the center of curvature of the guide groove of the inner joint member are offset on the opposite sides to each other in the axial direction by the same distances with respect to the center plane of the joint that includes the centers of the torque transmitting balls, and consequently constant velocity characteristics of the joint is maintained and good feel of rotation (smoothness of rotation) can be achieved.

(3) The operating angle of the joint can be increased by providing the regions free of undercut in the guide grooves of the outer joint member and the inner joint member.

(4) It is made easier to assemble the cage into the outer joint member by forming the region on the opening side of the inner circumferential surface of the outer joint member in a cylindrical surface that fits onto the outer circumferential surface of the cage.

(5) The constant velocity universal joint of the present invention is light in weight, small in size and low cost, and rotates smoothly without backlash while being capable of taking a large operating angle, and therefore contributes to the improvements in performance such as the stability of steering and feel of steering and in the freedom of designing the layout of vehicle components when used in the steering apparatus of automobile.

Figure 25:
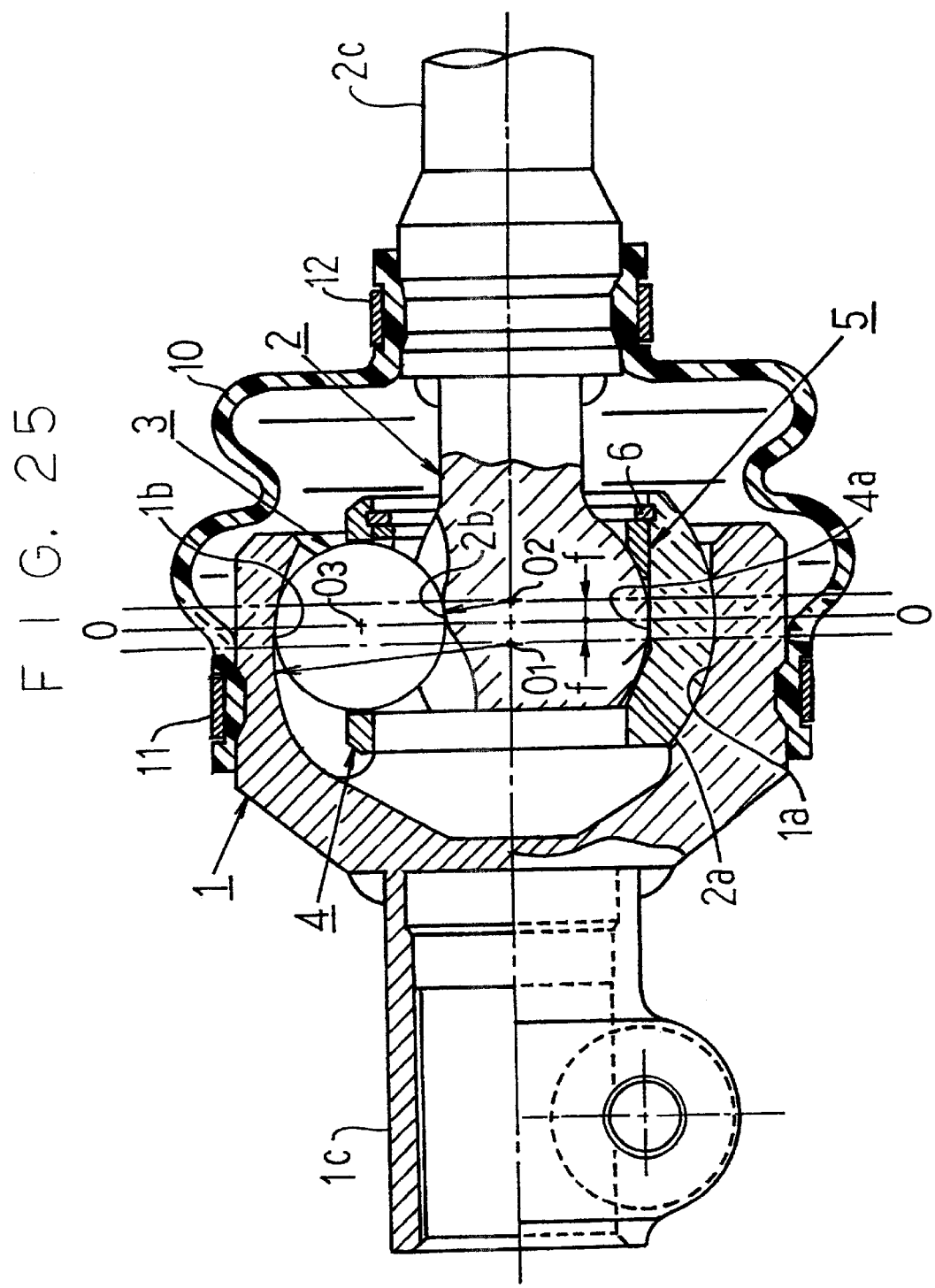
FIG. 25 is a longitudinal sectional view of the constant velocity universal joint of forth embodiment.
Figure 26:
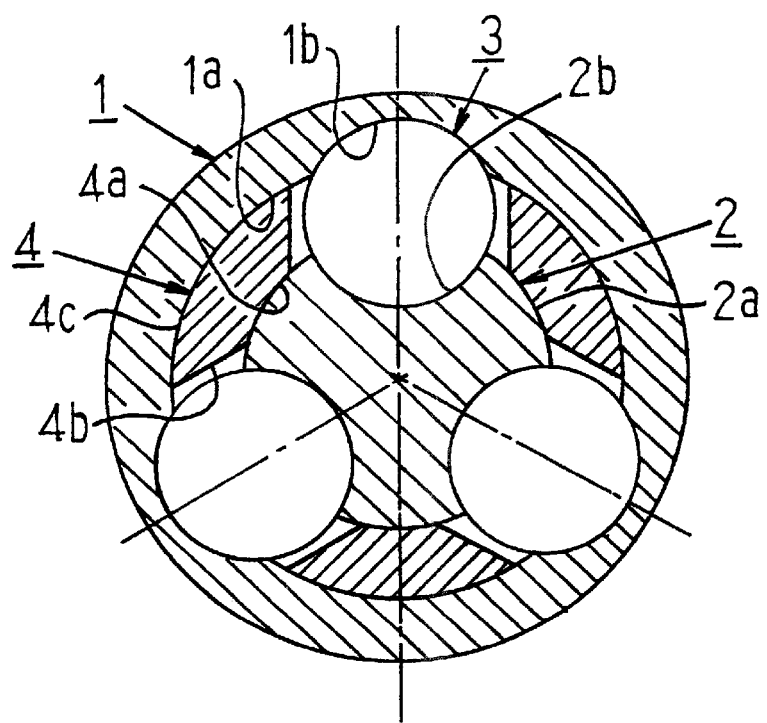
FIG. 26 is a cross sectional view taken along line O—O in FIG. 25 (boot is omitted).

The constant velocity universal joint of forth embodiment shown in FIG. 25 and FIG. 26 connects an intermediate shaft (22) and a gear shaft (24) of a steering gear (23) to be capable of freely making an angular displacement in, for example, an automobile steering apparatus shown in FIG. 34.

The constant velocity universal joint of this embodiment comprises an outer joint member 1 that has, for example, three curved guide grooves 1b formed in the axial direction on a spherical inner circumferential surface 1a thereof, an inner joint member 2 that has, for example, three curved guide grooves 2b formed in the axial direction on a spherical outer circumferential surface 2a thereof, for example, three torque transmitting balls 3 disposed in ball tracks that are formed by the coordination of the guide grooves 1b of the outer joint member 1 and the guide grooves 2b of the inner joint member 2 that oppose the former, a cage 4 that holds the torque transmitting balls 3 and an elastic member 5 interposed between the outer circumferential surface 2a of the inner joint member 2 and the inner circumferential surface 4a of the cage 4.

Figure 28:
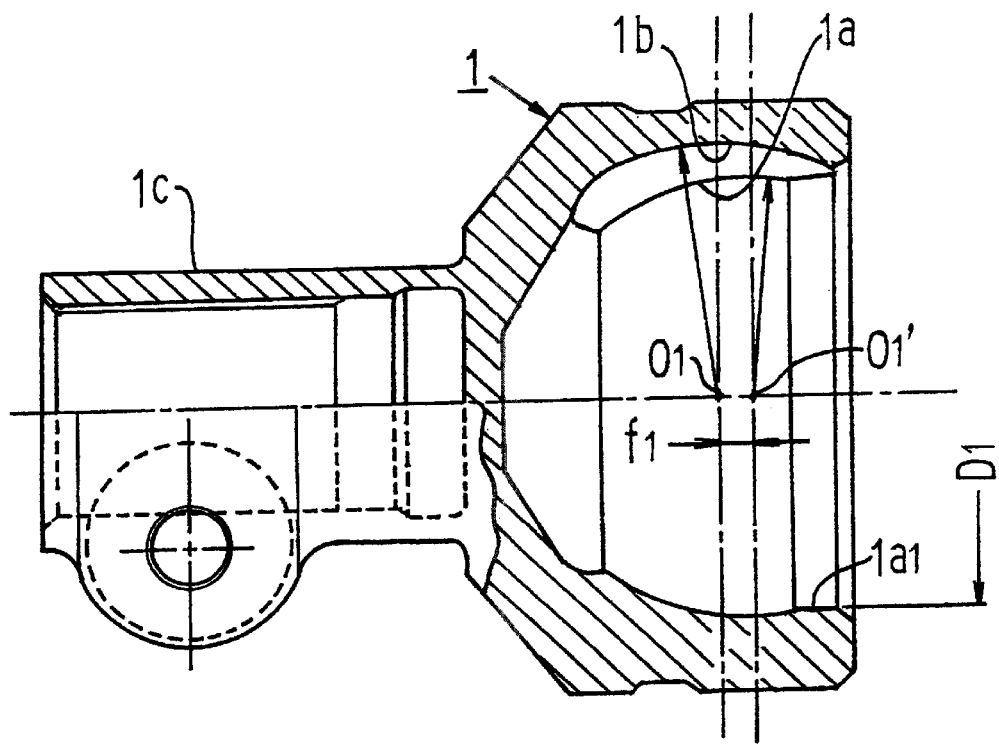
FIG. 28 is a longitudinal sectional view (partially side view) of the outer joint member.

In this embodiment, as shown in FIG. 28, the outer joint member 1 has a cup shape that opens at one end thereof and is provided with a yoke 1c formed integrally therewith at the other end thereof for connecting a gear shaft (for example, a pinion shaft) of a steering gear (for example, a rack and pinion type steering gear). By integrally forming the outer joint member 1 and the yoke 1c, it is made possible to reduce the number of manufacturing processes, the number of parts and the number of assembly steps and reduce the cost. Concentricity of both members can also be ensured.

Figure 30A:
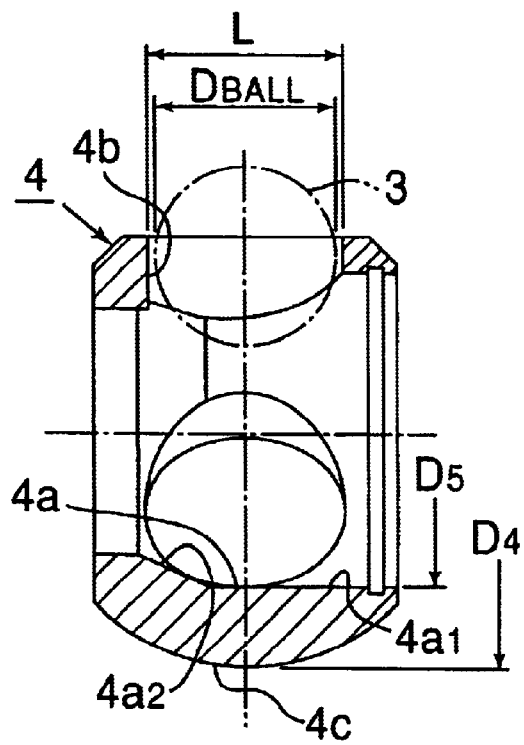

The center of curvature O1 of the guide groove 1b is offset by a predetermined distance f1 from the center of curvature O1' of the inner circumferential surface 1a in the axial direction (toward the innermost side of the joint in this embodiment). A region on the opening side of the inner circumferential surface 1a is formed in a cylindrical surface 1a1. Inner radius D1 of the cylindrical surface 1a1 is set to such a value that is capable of enclosing the outer diameter of the cage 4 (direction shown in FIG. 30(a)) to be described later.

The outer joint member 1 is preformed roughly to a predetermined shape from, for example, steel in hot forging or semi-hot forging process, while the inner circumferential surface 1a and the guide groove 1b are formed in cold forging process. While the inner circumferential surface 1a is further subjected to a post process (grinding or the like) to ensure accuracy, the cold forging process described above may be regarded as the final finishing process with regards to the guide groove 1b. In this case, surface of the guide groove 1b constitutes the surface of the final product that has been formed by cold forging. Since this makes the post processing (grinding, etc.) of the guide groove unnecessary, manufacturing cost for the outer joint member is reduced in comparison to the prior art.

Figure 29:
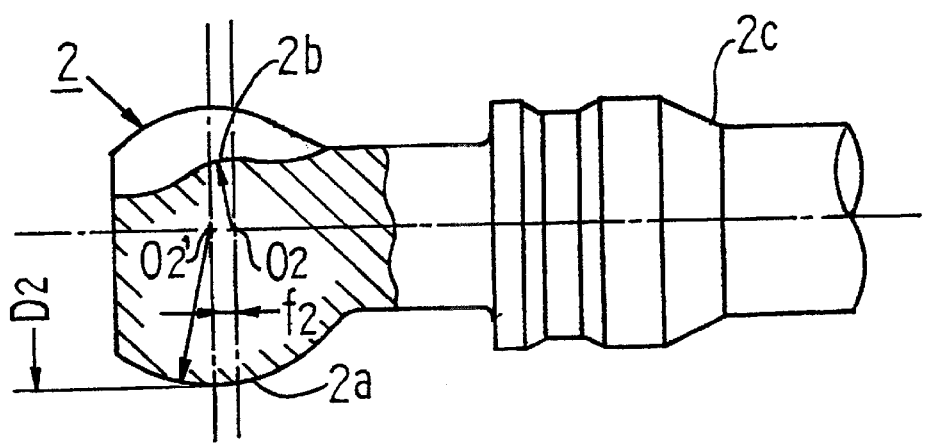
FIG. 29 is a longitudinal sectional view (partially side view) of the inner joint member.

In this embodiment, as shown in FIG. 29, the inner joint member 2 has the shaft portion 2c that serves also as the intermediate shaft (22: refer to FIG. 34) being integrally formed therewith. Formed on one end (not shown) of the shaft portion 2c is, for example, a connecting portion that is connected to the outer joint member (having the yoke integrally formed therewith) of the constant velocity universal joint (having the same constitution as that of the constant velocity universal joint according to the present embodiment) on the steering wheel side (connected to the yoke). Forming the shaft portion 2c integrally with the inner joint member 2 makes it possible to reduce the number of manufacturing processes, the number of parts and the number of assembly steps and reduce the cost.

The center of curvature O2 of the guide groove 2b is offset by a predetermined distance f2 from the center of curvature O2' of the outer circumferential surface 2a in the axial direction (toward the opening side of the joint in this embodiment). Direction of offset of the guide groove 2b is opposite to that of the guide groove 1b of the outer joint member 1 (the guide groove 1b is offset toward the innermost side, and the guide groove 2b is offset toward the opening).

The inner joint member 2 is preformed roughly to a predetermined shape from, for example, steel in hot forging or semi-hot forging process, while the outer circumferential surface 2a and the guide groove 2b are formed in cold forging process. While the outer circumferential surface 2a is subjected to a post process (grinding process or the like) to ensure accuracy, the cold forging process described above may be regarded as the final finishing process for the guide groove 2b. In this case, surface of the guide groove 2b constitutes the surface of the final product that has been formed by cold forging. Since this makes the post processing (grinding, etc.) of the guide groove unnecessary, manufacturing cost of the inner joint member is reduced in comparison to the prior art.

Figure 30B:
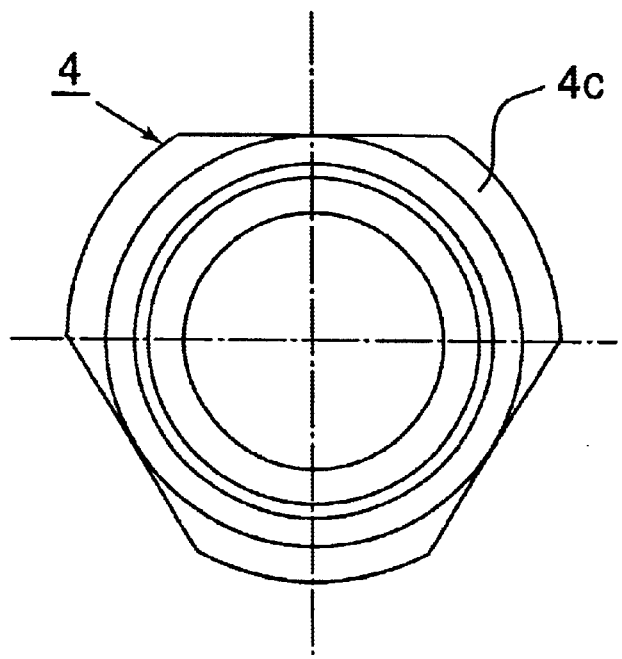

In this embodiment, as shown in FIG. 30, the cage 4 has three window-like pockets 4b that accommodate the torque transmitting balls 3. The inner circumferential surface 4a of the cage 4 has a region on the opening side that is formed in a cylindrical surface 4a1 and an innermost side region formed in a conical surface 4a2. Inner radius D5 of the cylindrical surface 4a1 is made larger than the radius D2 of the outer circumferential surface 2a of the inner joint member 2 (D5>D2). The inner region may also be formed in a spherical surface or a cylindrical surface. The outer circumferential surface 4c of the cage 4 is a spherical surface having radius D4. The cage 4 may be made of a metal, but may also be made of a resin in order to further reduce the weight and cost.

The dimension L in the axial direction of the pocket 4b of the cage 4 is equal to or greater than diameter $D_{BALL}$ of the torque transmitting balls 3 accommodated therein ($L \geq D_{BALL}$). Clearance δ of the pocket ($=L-D_{BALL}$) in the axial direction between the pocket 4b and the torque transmitting balls 3 is set in a range of $0 \leq \delta \leq 55$ μm for the reason described previously.

In this embodiment, a split ring that can increase and decrease the diameter thereof as shown in FIG. 31 is adopted as the elastic member 5. The elastic member 5 is made of spring steel or the like, and has one opening 5a and three claws 5b that protrude in the axial direction. End of each of the claws 5b is formed in a concave spherical surface 5c having the same radius of curvature as that of the outer circumferential surface 2a of the inner joint member 2. The elastic member 5 may also be made of an elastic material such as resin or rubber. The elastic member 5 may also be made in an integral ring without the opening 5a. In this case, the elastic force required may be provided by the elasticity of the claws (5b), or by the combined use of an elastic ring such as a corrugated plate spring, a rubber ring or a resin ring. Further, the end portion (5c) of the claw (5b) may be formed in such a shape that makes linear contact with the outer circumferential surface 2a of the inner joint member 2, for example a conical shape (conical surface).

The constant velocity universal joint of this embodiment is assembled through a step of assembling the cage 4 into the inner circumferential surface 1a of the outer joint member 1, a step of assembling the torque transmitting balls 3 into the pocket 4b of the cage 4, a step of assembling the inner joint member 2 into the inner circumferential surface 4a of the cage 4, and a step of assembling the elastic member 5 into the inner circumferential surface 4a (cylindrical surface 4a1) of the cage 4 and securing with a retainer ring 6 to prevent the assembly from coming off. Since the region on the opening side of the inner circumferential surface 1a of the outer joint member 1 has the cylindrical surface 1a1 that can enclose the outer diameter of the cage 4 (direction shown in FIG. 30(a)), the cage 4 can be easily assembled into the outer joint member 1. Also the torque transmitting balls 3 can be assembled into the pocket 4b directly from the inner circumferential side of the cage 4. Moreover, since the region on the opening side of the inner circumferential surface 4a of the cage 4 has the cylindrical surface 4a1 having radius D5 (>D2) and the center O2 of the guide groove 2b of the inner joint member 2 is offset toward the opening side, the inner joint member 2 can be assembled into the inner circumferential surface 4a of the cage 4 and the torque transmitting balls 3 by advancing the inner joint member 2 in the axial direction under such a state that the axis of the inner joint member 2 is aligned with the center axes of the cage 4 and the outer joint member 1. The elastic member 5 is assembled into the inner circumferential surface 4a (cylindrical surface 4a1) of the cage 4, and the outer circumferential surface 2a of the inner joint member 2 is pressed toward the innermost side of the joint in the axial direction by the spherical portion (or conical portion) 5c of the elastic member 5, with the retainer ring 6 applied for retention. Instead of using the retainer ring 6, the elastic member 5 may also be secured to prevent it from coming of f by such means as caulking the elastic member 5 onto the cylindrical surface 4a1 of the cage 4, bonding (welding, etc.) and fitting engagement (for example, a projection provided on the elastic member 5 is fitted in an engagement groove formed in the cylindrical surface 4a1 of the cage 4).

When the outer joint member 1, the inner joint member 2, the torque transmitting balls 3, the cage 4, and the elastic member 5 have been assembled in the configuration described above, the constant velocity universal joint of this embodiment shown in FIG. 25 and FIG. 26 is completed. The center O1 of the guide groove 1b of the outer joint member 1 and center O2 of the guide groove 2b of the inner joint member 2 are offset on the opposite sides to each other (center O1 is offset toward the inside of the joint, and center O2 is offset toward the opening of the joint) in the axial direction by the same distances f with respect to the center plane O of the joint that includes the centers O3 of the torque transmitting balls 3. Thus the ball track formed by the coordination of the guide groove 1b and the guide groove 2b has a wedge-like shape that expands toward the innermost side and gradually reduces toward the opening. A boot 10 is applied on the outer circumference of the outer joint member 1 and on the outer circumference of the shaft 2c of the inner joint member 2, and is clamped by means of boot bands 11, 12.

When the outer joint member 1 and the inner joint member 2 make an angular displacement of θ, the torque transmitting balls 3 which are guided by the cage 4 are always held in the bisecting plane (θ/2) of the angle θ regardless of the value of the operating angle θ, thereby maintaining constant velocity characteristics of the joint.

Figure 27:
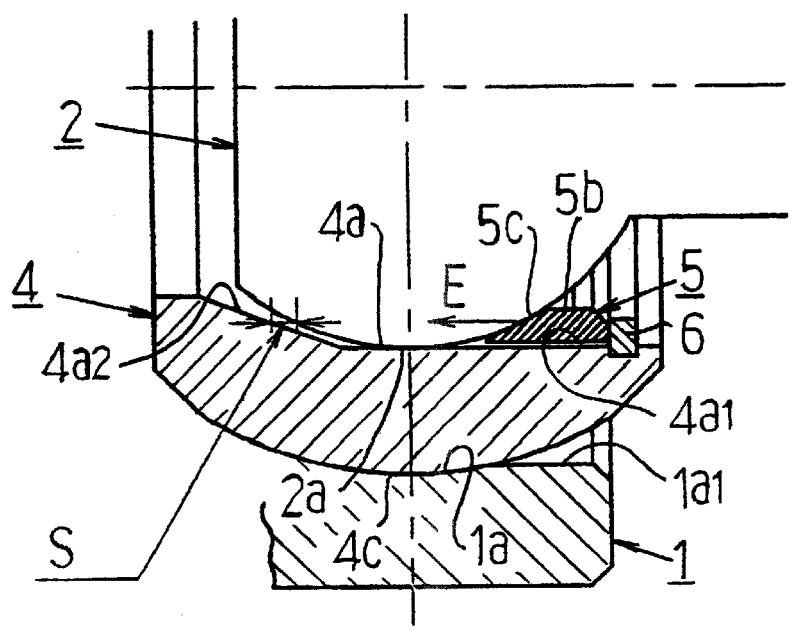
FIG. 27 is an enlarged longitudinal sectional view of a key portion in FIG. 25.

As shown in an enlarged view of FIG. 27, a clearance S is provided in the axial direction between the inner circumferential surface 4a (conical surface 4a2) of the cage 4 and the outer circumferential surface 2a of the inner joint member 2, thereby to allow a relative displacement of the inner joint member 2 in the axial direction with respect to the cage 4 (and the outer joint member 1). The axial clearance S and the elastic member 5 constitute the preloading means.

Elastic force E of the elastic member 5, that is interposed between the outer circumferential surface 2a of the inner joint member 2 and the inner circumferential surface 4a (cylindrical surface 4a1) of the cage 4, presses the outer circumferential surface 2a of the inner joint member 2 in the direction (toward the innermost side of the joint) opposite to the direction (toward the opening of the joint) of offset of the center O2 of the guide groove 2b. Under the pressing force E of the elastic member 5, the inner joint member 2 undergoes a relative displacement in the axial direction to the side (toward the innermost side of the joint) opposite to the direction of offset of the center O2, thereby to press the torque transmitting balls 3, and stops at a position where the inner clearance between the torque transmitting balls 3 and the guide grooves 1b, 2b of the outer and inner joint members 1, 2 disappears. As a result, a certain amount of preload E is applied in the axial direction to the torque transmitting balls 3, thus eliminating the rotation backlash (play in the circumferential direction).

Since the size of the clearance $\delta$ ($=L-D_{BALL}$) of the pocket in the axial direction between the pocket 4b of the cage 4 and the torque transmitting balls 3 is set in a range of $0 \leq \delta \leq 55$ μm, the constant velocity universal joint of this embodiment has less resistance to rotation when transmitting torque while taking an operating angle, and provides good feel of steering (smoothness of rotation).

FIG. 32 shows a modification of the forth embodiment. In this embodiment, the guide grooves 1b of the outer joint member 1 and the guide grooves 2b of the inner joint member 2 have regions 1b1, 2b1, respectively, that are free of undercut being provided thereon. For example, the region 1b1 is provided in the joint on the innermost side of the center line O1 of the guide groove 1b and is parallel to the axis of the outer joint member 1. The region 2b1 is provided in the joint on the opening side of the center line O2 of the guide groove 2b and is parallel to the axis of the inner joint member 2. By providing the regions 1b1, 2b1 that are free of undercut, the operating angle of the joint can be increased.

Figure 33:
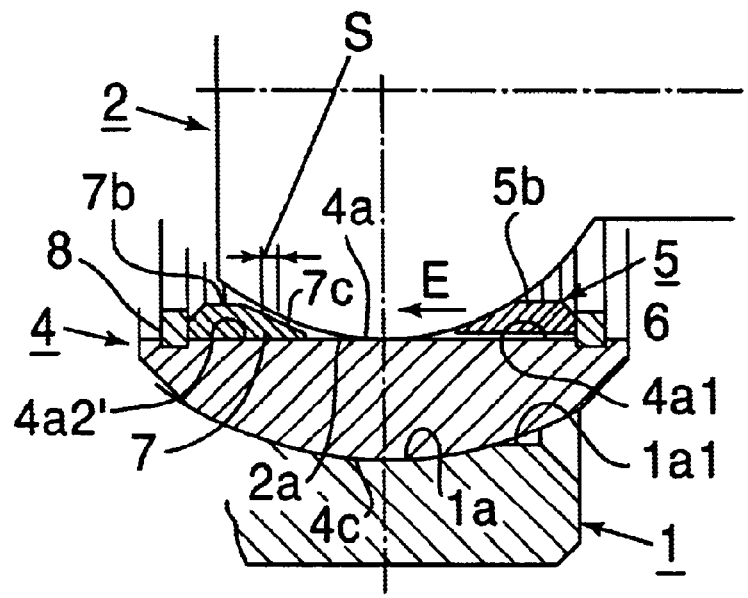
FIG. 33 is an enlarged sectional view of a key portion of the constant velocity universal joint according to another modification of the forth embodiment.

FIG. 33 shows another modification of the forth embodiment. In this embodiment, the entire region of the inner circumferential surface 4a of the cage 4 is formed in a cylindrical surface, and the elastic member 5 is mounted in the region 4a1 on the opening side of the inner circumferential surface 4a while an auxiliary ring 7 is mounted in the innermost side region 4a2' of the inner circumferential surface 4a. The auxiliary ring 7 is, for example, an integral ring that has claws 7b and spherical portions (or conical portions) 7c similarly to the elastic member 5 described previously, and is fitted in the innermost side region 4a2' and fastened by a retainer ring 8. The clearance S is provided in the axial direction between the spherical surface (or conical surface) 7c of the auxiliary ring 7 and the outer circumferential surface 2a of the inner joint member 2. The clearance S of the axial direction and the elastic member 5 constitute the preloading means. This constitution has an advantage that the configuration of the cage 4 can be made simpler than in the embodiment described above.

In the automotive steering apparatus shown in FIG. 34, a constant velocity universal joint similar to those of the embodiments described above may be used as a universal joint (28) that connects the main shaft (21) and the intermediate shaft (22) while allowing it to make angular displacement freely.

By the forth embodiment, the following effects can be obtained.

(1) Since the preloading means is provided to reduce the clearance between the torque transmitting balls and the ball track, rotation backlash (play in the circumferential direction) does not take place.

(2) Since the size of the clearance δ of the pocket in the axial direction between the pocket of the cage and the torque transmitting balls is set in the range of $0 \leq \delta \leq 55$ μm, the joint has less resistance to rotation when transmitting torque while taking an operating angle, and provides good feel of steering (smoothness of rotation).

(3) The operating angle of the joint can be increased by providing the regions free of undercut in the guide grooves of the outer joint member and the inner joint member.

(4) It is made easier to assemble the cage into the outer joint member by forming the region on the opening side of the inner circumferential surface of the outer joint member in a cylindrical surface that fits onto the outer circumferential surface of the cage.

(5) The constant velocity universal joint of the present invention is light in weight, small in size and low cost, and rotates smoothly without backlash while being capable of taking a large operating angle, and therefore contributes to the improvements in performance such as the stability of steering, feel of steering, steering force and auto-centering capability, and in the freedom of designing the layout of vehicle components when used in the steering apparatus of automobile.

What is claimed is:

1. A constant velocity universal joint comprising:
    an outer joint member having a curved guide groove formed in the axial direction on a spherical inner circumferential surface thereof;
    an inner joint member having a curved guide groove formed in the axial direction on a spherical outer circumferential surface thereof;
    a ball track formed by the coordination of the guide groove of said outer joint member and the guide groove of said inner joint member that opposes the former, the ball track having a wedge-like shape that reduces toward one side in the axial direction;
    a torque transmitting ball disposed in the ball track;
    a cage having a pocket for holding the torque transmitting ball; and
    a preloading means that reduces a clearance between the torque transmitting ball and the ball track,
    wherein a clearance δ of the pocket in the axial direction between the pocket of said cage and the torque transmitting ball is set in a range of $0 \geq \delta \geq 55$ μm,
    wherein said preloading means comprises an elastic member interposed between said inner joint member and the cage, and
    wherein the elastic member presses said inner joint member in a direction opposite to an offset direction of a center of the guide groove of said inner joint member.

2. The constant velocity universal joint as described in claim 1, wherein said preloading means further comprises:
    a clearance S provided in the axial direction between said inner joint member and the cage.

3. The constant velocity universal joint as described in claim 1, wherein the guide groove of said outer joint member and the guide groove of said inner joint member have regions that are free of undercut.

4. The constant velocity universal joint as described in claim 1, wherein a region on an opening side of the inner circumferential surface of said outer joint member is formed in a cylindrical surface that is disposed about and separate from the outer circumferential surface of the cage.

5. The constant velocity universal joint as described in claim 1, wherein said joint is usable in a steering apparatus of an automobile.

6. A constant velocity universal joint comprising:
    an outer joint member having a curved guide groove formed in the axial direction on a spherical inner circumferential surface thereof, the guide groove of said outer joint member having a center of curvature at a point (O1) that is offset by a predetermined distance (f1) from a center of curvature of the spherical inner circumferential surface of said outer joint member to one side in the axial direction;
    an inner joint member having a curved guide groove formed in the axial direction on a spherical outer circumferential surface thereof, the guide groove of said inner joint member having a center of curvature at a point (O2) that is offset by a predetermined distance (f2) from a center of curvature of the spherical outer circumferential surface of said inner joint member to the other side in the axial direction;
    a ball track formed by the coordination of the guide groove of said outer joint member and the guide groove of said inner joint member that opposes the former;
    a torque transmitting ball disposed in the ball track;
    a cage that holds the torque transmitting ball; and
    a preloading means that reduces a clearance between the torque transmitting ball and the ball track by causing an elastic relative displacement in the axial direction between at least one of said outer joint member and said inner joint member and the torque transmitting ball,
    wherein the offset distance (f1) of the center of curvature (O1) of the guide groove of said outer joint member and the offset distance (f2) of the center of curvature (O2) of the guide groove of said inner joint member are set to have different values, and
    wherein the center of curvature (O1) of the guide groove of said outer joint member and the center of curvature (O2) of the guide groove of said inner joint member are offset in the opposite directions by the same distances (f) in the axial direction with respect to the center plane of the joint that includes the center of the torque transmitting ball when the clearance between the torque transmitting ball and the ball track is reduced by the preloading means.

7. The constant velocity universal joint as described in claim 6, wherein the offset distance (f1) of the center of curvature (O1) of the guide groove of said outer joint member is larger than the offset distance (f2) of the center of curvature (O2) of the guide groove of said inner joint member.

8. The constant velocity universal joint as described in claim 6, wherein said preloading means comprises:
    a clearance S provided in the axial direction between said inner joint member and the cage; and
    an elastic member interposed between said inner joint member and the cage,
    wherein said elastic member presses said inner joint member in a direction opposite to the offset direction of the center of curvature of the guide groove of said inner joint member.

9. The constant velocity universal joint as described in claim 6, wherein the guide groove of said outer joint member and the guide groove of said inner joint member have regions that are free of undercut.

10. The constant velocity universal joint as described in claim 6, wherein a region on an opening side of the inner circumferential surface of said outer joint member is a cylindrical surface that is disposed about and separate from the outer circumferential surface of the cage.

11. The constant velocity universal joint as described in claim 6, wherein said joint is usable in a steering apparatus of an automobile.

* * * * *